(12) United States Patent
Kawamoto et al.

(10) Patent No.: US 7,621,812 B2
(45) Date of Patent: Nov. 24, 2009

(54) GAME SYSTEM AND GAME PROGRAM

(75) Inventors: Kouichi Kawamoto, Kyoto (JP);
Toshiaki Suzuki, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 719 days.

(21) Appl. No.: 10/895,082

(22) Filed: Jul. 21, 2004

(65) Prior Publication Data
US 2005/0020363 A1    Jan. 27, 2005

(30) Foreign Application Priority Data
Jul. 22, 2003    (JP) .............................. 2003-277712

(51) Int. Cl.
*A63F 13/00*    (2006.01)
(52) U.S. Cl. .......................................... 463/30; 463/31
(58) Field of Classification Search .................. 463/32, 463/31, 30; 345/427
See application file for complete search history.

(56) References Cited

U.S. PATENT DOCUMENTS 6,050,896 A  *  4/2000  Hanado et al. ................. 463/32
6,468,157 B1 *  10/2002  Hinami et al. ................. 463/32
6,585,594 B2 *  7/2003  Togo et al. ..................... 463/31
2006/0040738 A1 *  2/2006  Okazaki et al. ............... 463/32

FOREIGN PATENT DOCUMENTS

| JP | 3185795 | * | 8/1991 |
| JP | 11-066347 | | 3/1999 |
| JP | 11066347 | * | 3/1999 |
| JP | 2001-070632 | | 3/2001 |
| JP | 2001070632 | * | 3/2001 |
| JP | 2002-163676 | | 6/2002 |
| JP | 2002163676 | * | 6/2002 |

* cited by examiner

*Primary Examiner*—Peter DungBa Vo
*Assistant Examiner*—Masud Ahmed
(74) *Attorney, Agent, or Firm*—Nixon & Vanderhye P.C.

(57) ABSTRACT

In a game system, at least two of objects are set as selected objects. First, a virtual frame (a first frame 77) perpendicular to a line of sight is set on a frame setting plane 76. The first frame 77 is set so that selected objects 81 through 84 are positioned inside of the first frame 77 when viewed from a direction of the line of sight. Furthermore, the first frame 77 is deformed in accordance with movements of the selected objects 81 through 84. Specifically, when all of the selected objects 81 through 84 are a predetermined distance away from one side of the frame 77 when viewed in the direction of the line of sight, the side is moved toward the inside of the first frame 77, thereby deforming the first frame 77.

21 Claims, 17 Drawing Sheets

F I G. 1 5
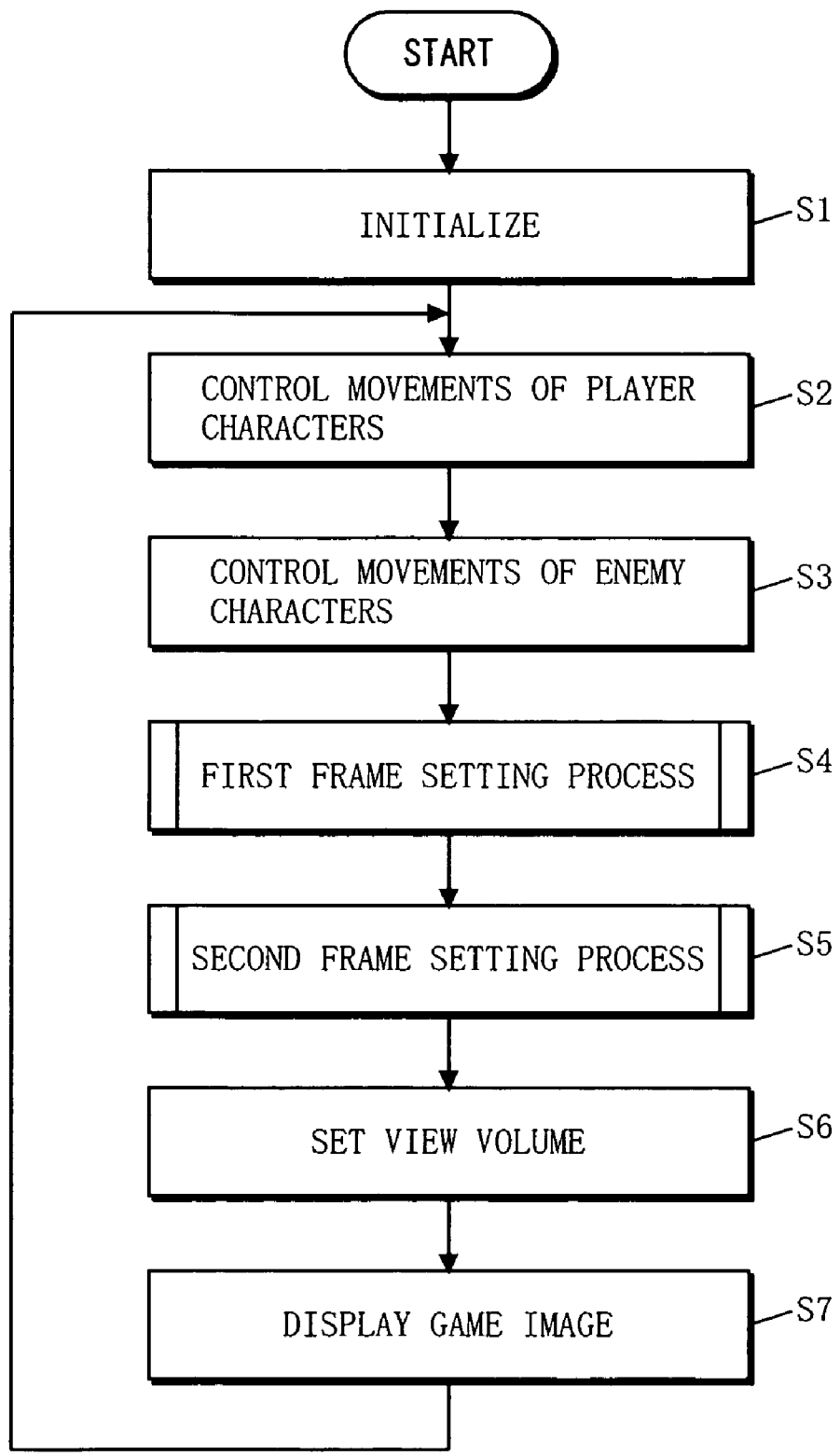

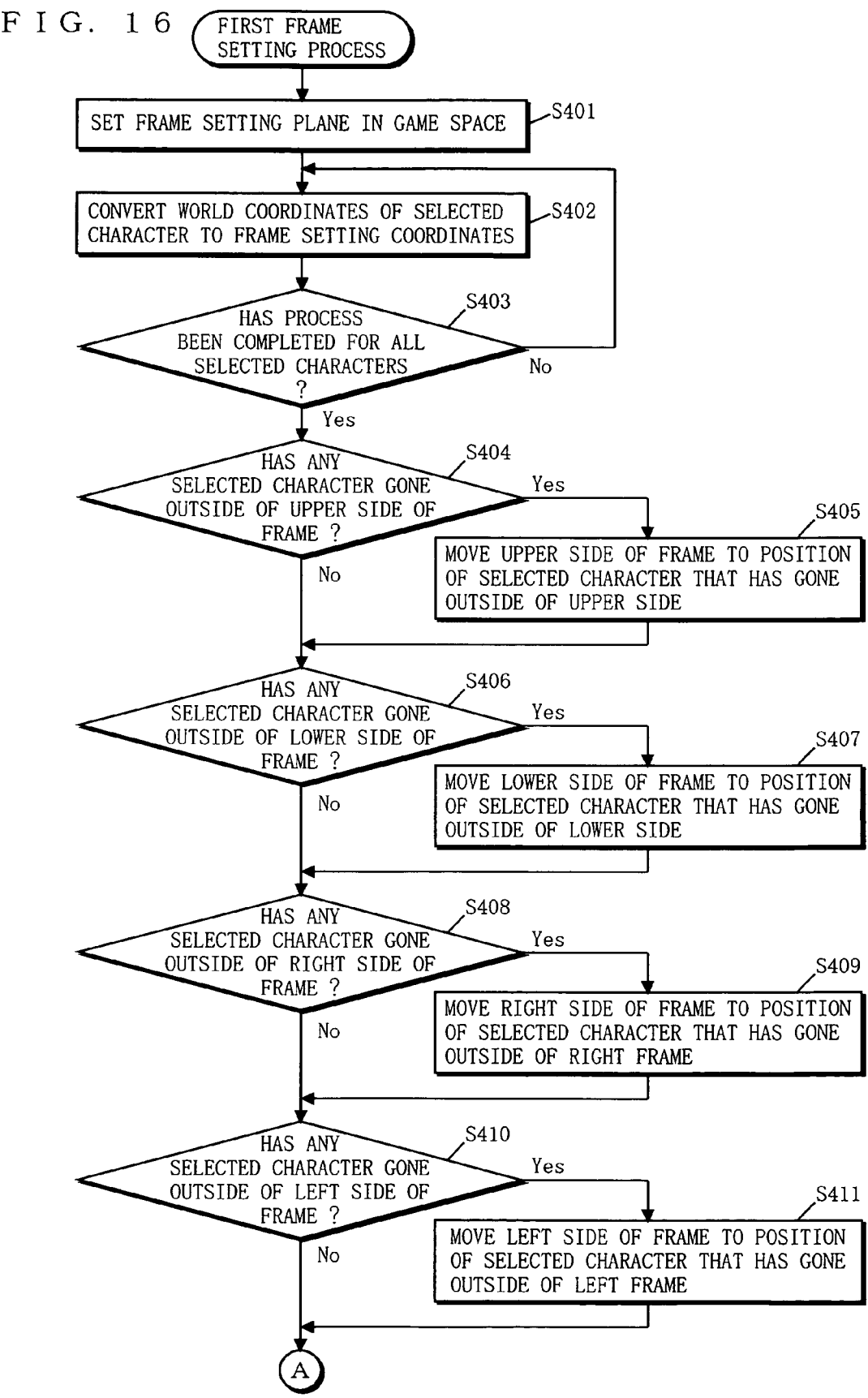

GAME SYSTEM AND GAME PROGRAM

BACKGROUND OF THE INVENTION

1. Field of the Invention

The present invention relates to game systems and game programs that cause a game space to be displayed on a display device and, more specifically, to a game system and a game program that changes a display area according to positions of objects.

2. Description of the Background Art

Conventionally, a large number of games where a plurality of objects appear in a two- or three-dimensional space have been available. In such a game, which area on the game space is set as a display area is an important issue. When a plurality of objects are all important objects in the game, the display area is set so that all of these objects can be displayed inside of the display area.

In view of the above, a game system has been devised in which a display area in a game space can be changed so that a plurality of objects can be included in the display area. In such a game system, two frames, an inner frame and an outer frame, are set on a screen. Using these frames, image zoom-up or zoom-down is performed. Here, such a game system is specifically described below by taking a soccer game as an example. When all athlete characters (objects) are present inside of the inner frame, the image is zoomed up (the display area is reduced). When one of the athlete characters goes outside of the outer frame, the image is zoomed down (the display area is enlarged). With this, a plurality of objects (for example, a soccer ball and the athlete characters) can be included in the display area. Furthermore, using these two frames, that is, the inner and outer frames, prevents the user from feeling uncomfortable in viewing the game screen due to frequent changes between zoom-up and zoom-down.

In the above game system, a fixation point on the display area (the fixation point is assumed herein to be the center point of the display area, that is, a point displayed at the center of the screen) is set fixedly at a single specific object. Specifically, since the above game system is for a soccer game, the fixation point is set at a soccer ball object. That is, the display area is determined so that the soccer ball is always displayed near the center of the screen.

In the above game system, since the fixation point is set fixedly at a single object, the fixation point moves as the object moves. Therefore, when the object frequently moves, the fixation point and also the display area frequently move. Such a display with the fixation point frequently moving is difficult for the player to view. Specifically, it would be difficult to understand the state of movement of objects other than that of the object at the fixation point.

Moreover, depending on the game contents, the scheme of setting a fixation point fixedly at a single object may not be appropriate. For example, the scheme may not be appropriate for multiplay-type games where characters are operated by a plurality of players, that is, games where objects to which a plurality of players would pay attention are present on a single screen. In such games, if the fixation point is set fixedly at one particular object, that object is displayed on the center of the screen, and therefore the state of the object and its surroundings is displayed so as to be easy to view. However, other objects and their surroundings are not necessarily displayed so as to be easy to view.

For example, in multiplay-type games, each player pays most attention to a player character operated by that player. That is, each player pays attention to each different character. However, in the conventional scheme, the fixation point is set fixedly at only one of the characters, and that character is always displayed at the center of the screen. Such a display is easy to view for a player who pays most attention to the character displayed on the center of the screen. For other players, however, such a display is not easy to view and might be unfair insofar as viewability of the screen. As such, the scheme of setting the fixation point at one specific point in the game space is not necessarily appropriate when a plurality of objects receiving attention are present because viewability of the object at the fixation point and viewability of other objects are completely different from each other.

SUMMARY OF THE INVENTION

Therefore, an object of the present invention is to provide a game system and a game program that prevent a fixation point from frequently moving and allow excellent viewability of a display area in a game space.

Another object of the present invention is to provide a game system and a game program that prevent changes in size of the display area and allow excellent viewability of the display area in the game space.

Still another object of the present invention is to provide a game system and a game program that allow a fixation point not to be set fixedly at a single object but to be appropriately set.

The present invention adopts the following structure to achieve the object mentioned above. Note that reference characters and numerals in parentheses below merely show examples of correspondence with the embodiment described further below for the sake of better understanding of the present invention, and do not restrict the scope of the present invention.

In order to achieve the objects mentioned above, the present invention is structured as follows. That is, a first aspect of the present invention is directed to a game system (1) for causing a three-dimensional virtual game space (game space 71) to be displayed on a display device (television 2) in a direction of a predetermined line of sight (73). The three-dimensional virtual game space has a plurality of objects appearing therein. In this game system, at least two of the plurality of objects are set as selected objects (first to third player characters 81 through 83 and first enemy character 84). Also, the game system includes movement control means (CPU 31 executing steps S2 and S3; only step number is hereinafter referred); line-of-sight direction setting means (S1); frame-setting-plane setting means (S401); frame-coordinate-value calculating means (S402); frame deforming means (S404 through S419); and display control means (S6 and S7). The movement control means controls the movements of the objects. The line-of-sight direction setting means sets the direction of the line of sight. The frame-setting-plane setting means sets a frame setting plane (76) in the three-dimensional game space. The frame-coordinate-value calculating means calculates a frame coordinate value. The frame coordinate value indicates, for each of the selected objects, a point of intersection of the frame setting plane and a straight line passing through the selected object in the three-dimensional game space and extending along the line of sight set by the line-of-sight direction setting means. The frame deforming means virtually sets a rectangular frame (first frame 77 or second frame 78) on the frame setting plane, the frame including every position indicated by the frame coordinate value of each of the selected objects, and deforms the frame in accordance with the movements of the selected objects. The display control means determines vertices of a view volume based on vertices of the frame deformed by the frame deforming means and causes the game space to be displayed on the display device. When every position indicated by the frame coordinate value of each of the selected objects is moved by at least a predetermined distance (á) inward from one side (upper side 77a, lower side 77b, left side 77c, or right side 77d) of the frame on the frame setting plane, the frame deforming means deforms the frame so that the side is moved towards the inside of the frame.

Typically, the display control means determines points on a straight line passing through the vertices of the frame deformed by the frame deforming means and extending along the line of sight set by the line-of-sight direction setting means as the vertices of the view volume.

Also, the frame-setting-plane setting means typically sets a plane perpendicular to the direction of the line of sight set by the line-of-sight direction setting means as the frame setting plane.

A second aspect of the present invention is directed to a game system for causing a three-dimensional virtual game space to be displayed on a display device in a direction of a predetermined line of sight. The three-dimensional virtual game space has a plurality of objects appearing therein. In this game system, at least two of the plurality of objects are set as selected objects. The game system includes: movement control means; viewing point position setting means; frame-setting-plane setting means; frame-coordinate-value calculating means; frame deforming means; and display control means. The movement control means controls the movements of the objects. The viewing point position setting means sets a position of a viewing point (79). The frame-setting-plane setting means sets a frame setting plane in the three-dimensional game space. The frame-coordinate-value calculating means calculates a frame coordinate value. The frame coordinate value indicates, for each of the selected objects, a point of intersection of the frame setting plane and a straight line connecting the selected object in the three-dimensional game space and the position of the viewing point set by the viewing point position setting means. The frame deforming means virtually sets a rectangular frame on the frame setting plane, the frame including every position indicated by the frame coordinate value of each of the selected objects, and deforms the frame in accordance with the movements of the selected objects. The display control means determines vertices of a view volume based on vertices of the frame deformed by the frame deforming means and causes the game space to be displayed on the display device. When every position indicated by the frame coordinate value of each of the selected objects is moved by at least a predetermined distance inward from one side of the frame on the frame setting plane, the frame deforming means deforms the frame so that the side is moved towards the inside of the frame.

Typically, the display control means determines points on a straight line connecting the vertices of the frame deformed by the frame deforming means and the viewing point as the vertices of the view volume.

Also, when a position indicated by a frame coordinate value of any one of the selected objects is moved outside of one side of the frame on the frame setting plane, the frame deforming means may deform the frame so that the side is moved towards the outside of the frame.

The game system may further include frame expanding means (S404 through S411). The frame expanding means expands the frame deformed by the frame deforming means by a predetermined width upward, downward, rightward, and leftward on the frame setting plane. At this time, the display control means determines the vertices of the view volume based on the vertices of the frame expanded by the frame expanding means.

When a screen area provided on the display device for displaying the three-dimensional game space is set to have a shape of a rectangle having a predetermined aspect ratio, the game system may further include aspect ratio correcting means (S507 through S509). The aspect ratio correcting means increases either one of a height or a width of the frame so that an aspect ratio of the frame deformed by the frame deforming means is equal to the predetermined aspect ratio. At this time, the display control means determines the vertices of the view volume based on the vertices of the frame corrected by the aspect ratio correcting means.

Furthermore, the aspect ratio correcting means corrects the frame so that a center of the frame is not changed before and after correction.

Still further, the game system may further include frame correcting means (S503 and S506). The frame correcting means corrects the frame so that the frame deformed by the frame deforming means has a height longer than a predetermined height and a width longer than a predetermined width. At this time, the display control means determines the vertices of the view volume based on vertices of the frame corrected by the frame correcting means.

Still further, the game system may be used by a plurality of players for playing a game. At this time, the selected objects at least include a plurality of player characters operated by the plurality of players.

Still further, the game system may further include selected object changing means (S2 and S3) that adds a new selected object or deletes at least one of the selected objects. At this time, when addition or deletion is performed by the selected object changing means, the frame deforming means deforms the frame so that a moving distance of one side of the frame per predetermined unit time is shorter than a predetermined distance.

A third aspect of the present invention is directed to a game system for causing a two-dimensional virtual game plane to be displayed on a display device. The two-dimensional virtual game space has a plurality of objects appearing therein. In this game system, at least two of the plurality of objects are set as selected objects (first to third player characters 81 through 83 and first enemy character 84). The game system includes: movement control means; frame deforming means, and display control means. The movement control means controls the movements of the objects. The frame deforming means deforms a frame according to the movements of the selected objects, the frame having a shape of a rectangle and being virtually set on the two-dimensional game plane so that the selected objects are positioned inside of the frame. The display control means determines a display area to be displayed on the display device so that an area defined by the frame on the game plane is displayed. When all of the selected objects are moved by at least a predetermined distance inward from one side of the frame, the frame deforming means deforms the frame by moving the side towards the inside of the frame.

The present invention may be provided in a form of a game program to be executed by a computer of a game system or in a form of a storage medium having stored therein the game program. That is, the functions of the above-described game system may be provided by the game program to the game system.

According to the present invention, the frame is set so as to include a plurality of selected objects, thereby displaying these selected objects. Furthermore, the frame is deformed when all of the selected objects are moved inward from one side of the frame by a predetermined distance. That is, the frame is not necessarily deformed when any selected object is moved inward. Therefore, frequent deformations of the frame can be prevented, thereby preventing frequent changes in size of the display area. Thus, according to the present invention, the area for displaying the game space can be displayed so as to be easy to view. Still further, the fixation point is not fixed at one object, and the center of the frame is taken as the center of the screen. Therefore, the fixation point can be prevented from being frequently moved, thereby making it possible to display the plurality of the selected objects so as to be easy to view.

As evident from the first through third aspects, the above-mentioned effects can be obtained regardless of whether the game forms a three-dimensional game space or a two-dimensional game plane.

Also, the display control means determines points on the straight lines each passing through the relevant vertex of the deformed frame as the vertices of the view volume. With this, the view volume can be easily determined based on the direction of the line of sight.

Furthermore, a plane perpendicular to the direction of the line of sight is set as the frame setting plane. Therefore, the positional relation between the selected objects and the frame on the frame setting plane is identical to that between the selected objects and the display screen on a game image actually displayed. Therefore, the frame can be set with the actual display state being accurately reflected thereon, thereby making it easier to set the frame.

Still further, points on the straight lines connecting the viewing point and the vertices of the frame deformed by the frame deforming means are determined as the vertices of the view volume. With this, the view volume can be easily determined based on the viewing point.

Still further, the frame deforming means moves one side of the frame toward the outside of the frame. Therefore, even when any selected object is moved, all of the selected objects can be displayed on the screen.

Still further, the frame enlarging means can prevent any selected object from being displayed at the edge of the screen. Therefore, the plurality of selected objects can be displayed so as to be easier to view.

Still further, the size of the display area is changed only when both of the height and the width of the frame are changed by the aspect ratio correcting means. That is, when only either one of the height and the width of the first frame is changed, the size of the display area is not changed. Therefore, frequent changes in size of the display area can be further prevented, thereby improving viewability of the screen. Also, by correcting the aspect ratio, the game image can be prevented from being extended in the height or width direction. The shape of the near clipping plane and the shape of the far clipping plane of the view volume always have a shape similar to the shape of the screen area on which the game image of a game world is to be displayed. Therefore, the game image can be displayed so as to be always easy to view. Furthermore, when the frame is corrected so that the frame deformed by the frame deforming means is positioned at a center of a frame having the corrected aspect ratio, information that would be required for the player(s), that is, the selected objects, are displayed near the center of the screen. Therefore, the game screen can be displayed so as to be easier to view.

Still further, the frame correcting means can prevent the size of the display area from being too small, that is, from being too zoomed-up. With this, it is possible to prevent an image of a character or the like from being roughly displayed.

Still further, when the selected objects include at least a plurality of player characters operated by a plurality of players, all player characters can be displayed so as to be easy to view. Therefore, a display that is easy to view can be offered to all players.

Furthermore, the selected object changing means can prevent the size of the display area from being abruptly changed. Therefore, a display that is easier to view can be achieved.

These and other objects, features, aspects and advantages of the present invention will become more apparent from the following detailed description of the present invention when taken in conjunction with the accompanying drawings.

BRIEF DESCRIPTION OF THE DRAWINGS

FIG. 15 is a main flowchart of a game process to be performed in the game system according to the present embodiment;

FIGS. 16 and 17 are a flowchart showing a flow of a detailed process of step S4 shown in FIG. 15;

DESCRIPTION OF THE PREFERRED EMBODIMENT

Figure 1:
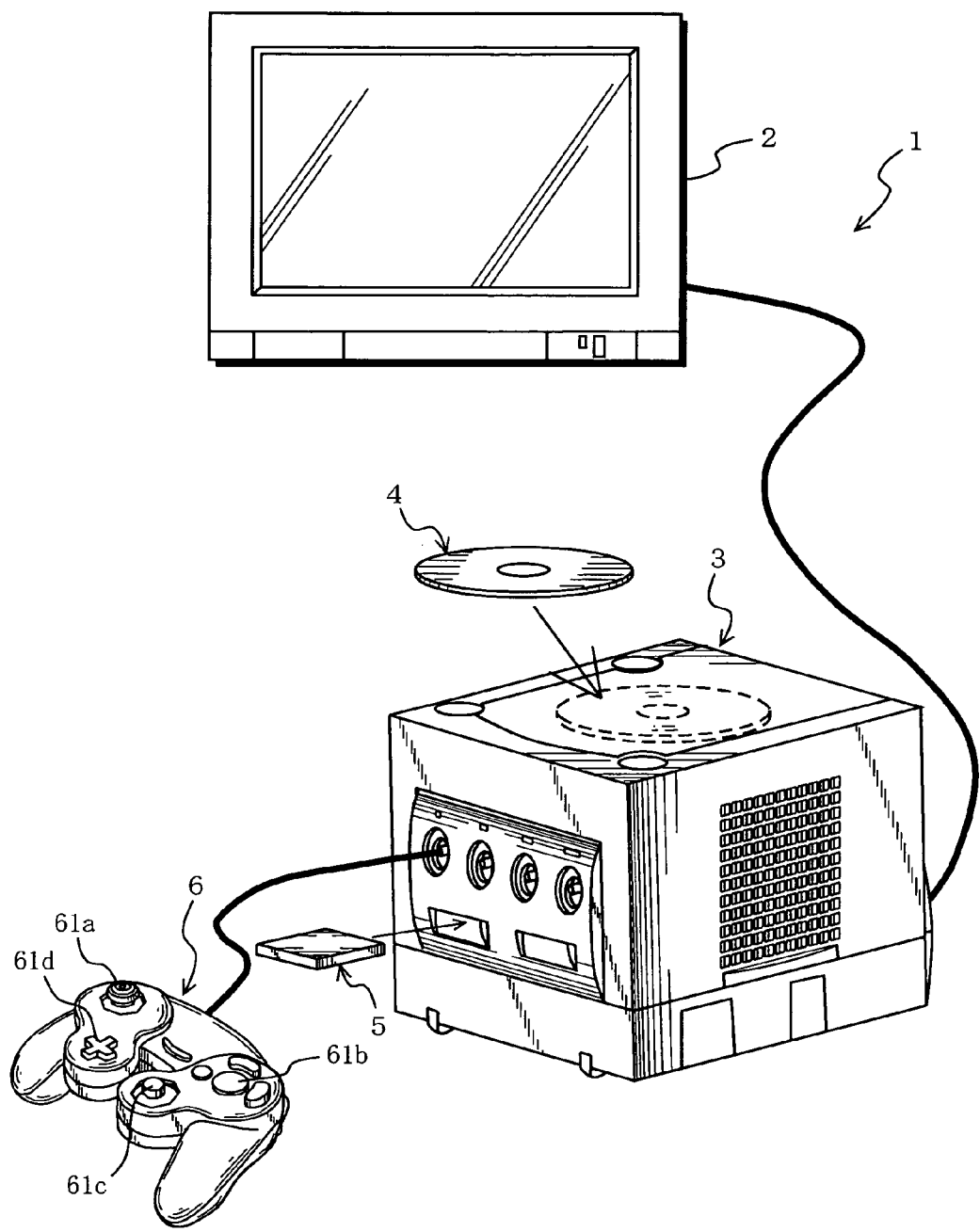
FIG. 1 is an external view of a game system 1.

A game system 1 according to an embodiment of the present invention is described below. FIG. 1 is an external view of the game system 1. In the following, a non-portable game machine is taken as an example of the game system according to the present invention for description. However, the game system according to the present invention is not restricted to a non-portable game machine, but may be applicable to devices having incorporated therein a computer for executing a game program, such as portable game machines, arcade game machines, portable terminals, cellular phones, or personal computers.

In FIG. 1, the game system 1 is configured such that a non-portable game machine (hereinafter simply referred to as a game machine) 3 is connected via a connection code to a television receiver (hereinafter referred to as a television) 2, which is one example of a display device. The game machine 3 has connected thereto a controller 6 having a plurality of operation switches operable by a player. The game machine 3 has removably inserted therein an optical disc 4, which is one example of an information storage medium storing a game program. Also, as required, the game machine 3 has removably inserted therein a memory card 5 including, for example, a flash memory for storing save data, etc. The game machine 3 executes the game program stored in the optical disc 4 to cause the execution results to be displayed on the television 2 as a game image. Furthermore, the game machine 3 can use the save data stored in the memory card 5 to play a portion continued from the previously executed portion of the game, or can reproduce the previous state of the game to cause a game image in that state to be displayed on the television 2. The player of the game machine 3 operates the controller 6 while viewing the game image displayed on the television 2, thereby enjoying the game.

As described above, the controller 6 is connected to the game machine 3 via the connection code, which is removable from the game machine 3. The controller 6 is an operation means for mainly operating a player object (typically, a game main character to be controlled by the player) appearing in a game space displayed on the television 2, and includes input units, such as operation buttons, keys, a stick, etc. Specifically, the controller 6 has formed thereon grip portions held by the player. Furthermore, the controller 6 includes a main stick 61a and a cross key 61d, which are operable typically by the left thumb of the player, and a C stick 61c and an A button 61b, which are operable typically by the right thumb of the player. The controller 6 further include a B button, an X button, a Y button, a start-pause button, an R button, which is operable typically by the right forefinger of the player, and an L button, which is operable typically by the left forefinger of the player. For example, when the player enjoys a game that will be described further below by operating the controller 6, the main stick 61a is used to indicate a movement of the player character operated by the player in a game world. Other operation switches may be used in the course of the game. However, operations of these operation switches are not directly related to the present invention and therefore are not described herein. Also, in the game system 1, with a plurality of controllers 6 being connected to the game machine 3, a plurality of players can simultaneously play the game.

Figure 2:
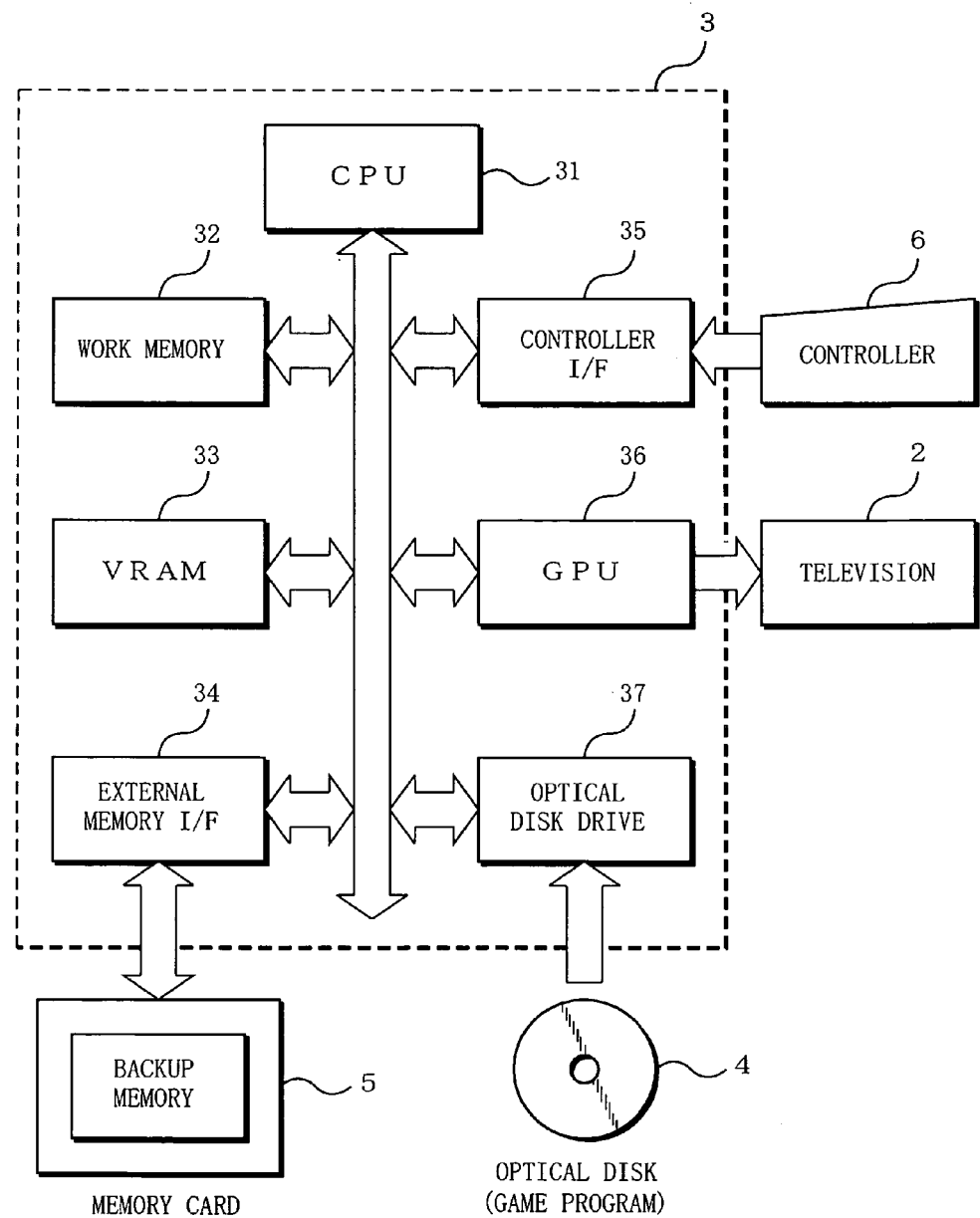
FIG. 2 is a functional block diagram showing a game machine 3.

With reference to FIG. 2, the structure of the game machine 3 is described below. FIG. 2 is a functional block diagram of the game machine 3. In FIG. 2, the game machine 3 includes a Central Processing Unit (CPU) 31 of, for example, 128 bits, for executing various programs. The CPU 31 executes a boot program stored in a boot ROM not shown to boot a memory, such as a work memory 32, once reads the game program stored in the optical disc 4 into the work memory 32, and then executes the game program for performing game processing in accordance with that game program. The CPU 31 is connected via a bus to the work memory 32, a video RAM (VRAM) 33, an external memory interface (I/F) 34, a controller interface (I/F) 35, a Graphics Processing Unit (GPU) 36, and an optical disc drive 37.

The work memory 32 is a storage area used by the CPU 31 and stores, as appropriate, a game program required for processes to be performed by the CPU 31. For example, the work memory 32 stores the game program and various data read from the optical disc 4 (refer to FIG. 14). These game program and various data stored in the work memory 32 are executed by the CPU 31. The VRAM 33 stores game image data for displaying a game image on the television 2. The external memory I/F 34 communicably connects the game machine 3 and the memory card 5 by fitting the memory card 5 in a connector not shown. The CPU 31 accesses a backup memory provided in the memory card 5 via the external memory I/F 34. The controller I/F 35 communicably connects an external device and the game machine 3 together via a connector not shown. For example, the controller 6 is fitted in the above connector via a connection code and is connected to the game machine 3 via the controller I/F 35. The GPU 36 is structured, for example, by a semiconductor chip for performing a calculation process, such as a vector operation and a rendering process, required for displaying 3D graphics in response to an instruction from the CPU 31. A game image rendered by the GPU 36 is displayed on the television 2. Upon reception of an instruction from the CPU 31, the optical disc drive 37 reads the game program and various data including image data and sound data stored in the optical disc 4.

Next, description is made to a game to be displayed on the television 2 by the game program stored in the optical disc 4 being executed by the game machine 3. Mainly described herein is a scheme of determining a display area to be displayed on the television 2 from among areas in a game space. Also, the game described below is assumed to be a game that can be played by a plurality of players. Specifically, it is assumed that three players (first to third players) operate three player character (first to third player characters), respectively, appearing on the game. Therefore, although not shown in FIG. 1, it is assumed in the present embodiment that the controller 6 and at least two other controllers are connected to the game machine. Furthermore, the controller to be used by the first player is referred to as a first controller, the controller to be used by the second player is referred to as a second controller, and the controller to be used by the third player is referred to as a third controller.

First, the display area determining scheme to be performed in the game system according to the present invention is schematically described below. In this scheme, the display area is set based on frames (first and second frames, which will be described further below) virtually set in the game space. These frames are set so that objects to be displayed (selected objects, which will be described further below) are displayed inside of the frames. Furthermore, the display area is determined so that at least an area inside of the frames is displayed. With this, the objects to be displayed are positioned within the display area, and therefore can be displayed on the television 2. In the following, the display area determining scheme to be performed in the game system 1 according to the present invention is described below in detail with reference to FIGS. 3 through 11.

Figure 3:
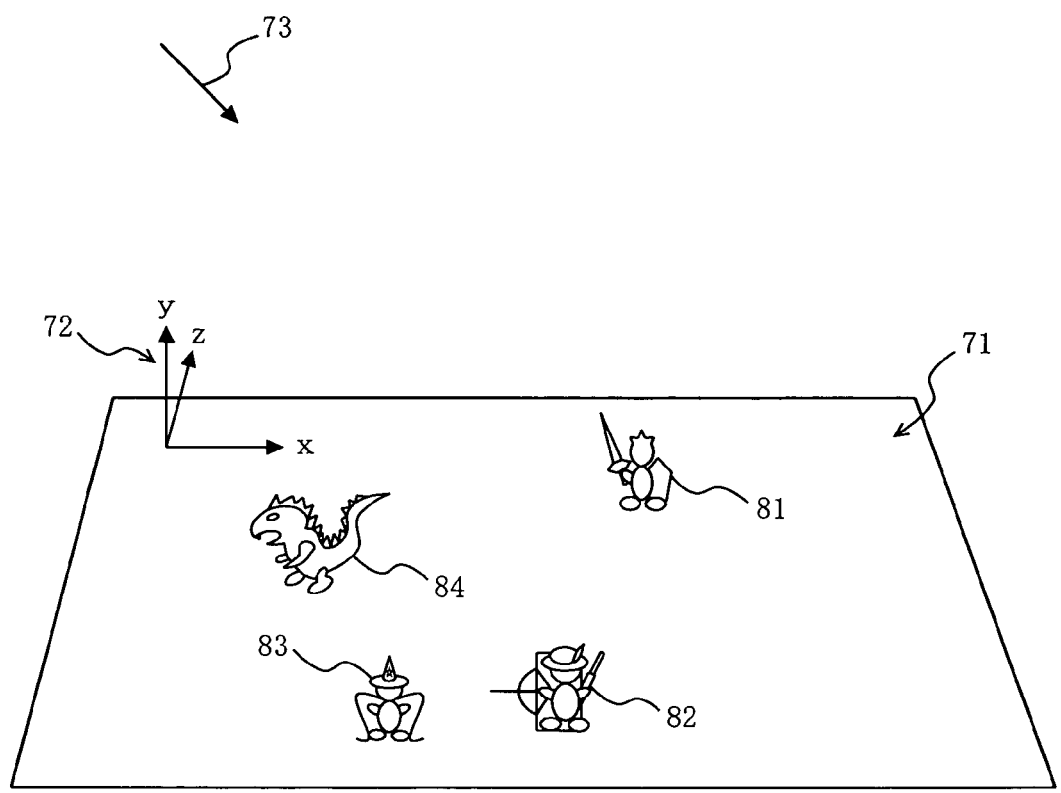
FIG. 3 is an illustration showing a game space formed by a game according to an embodiment of the present invention.

FIG. 3 is an illustration showing the game space formed by the game according to the present embodiment. In the game system 1, a game screen representing a virtual game space 71 viewed from a direction of a line of sight 73 is displayed on the television 2. In the present embodiment, the direction of the line of sight 73 is predetermined. In the game space 71, a plurality of objects appear. In FIG. 3, the game space 71 includes player characters 81 through 83 operated by the players and a first enemy character 84 whose movement is controlled in the game machine 3. Here, the first player character 81 is operated by the first player, the second player character 82 is operated by the second player, and the third player character 83 is operated by the third player. Also, since the game space 71 is a three-dimensional game space, the position in the three-dimensional space of each of the objects (typically, the first through three player characters 81 through 83 and the first enemy character 84) is represented by using a three-dimensional world coordinate system 72. That is, the position of each object in the game space is represented by a three-dimensional coordinate value (x, y, z). Such a three-dimensional coordinate value is called a world coordinate value.

In the present embodiment, the objects appearing on the game space 71 are classified into two types, selected objects and non-selected objects. The selected objects are objects that are taken as a reference for determining the display area. As the selected objects, two or more objects selected from the objects appearing on the game space 71 are set. It is assumed in the present embodiment that the type (either a selected object or anon-selected object) is predetermined for each object appearing in the game. Also, the object to which the player is assumed to pay attention is preferably set as a selected object. This is because the display area is determined so as to display all selected objects (however, an exception may be allowed, which will be described further below with reference to FIG. 19). In the present embodiment, it is assumed that the player characters 81 through 83 and the first enemy character 84 are set as selected objects. It is also assumed that a second enemy character 85, which will be described further below, is assumed to be as a non-selected object. For example, the first enemy character 84 may be a boss character which is meant to be important in the game scenario, while a second enemy character 85 may be merely one of ordinary enemy characters appearing in the game space.

Figure 4:
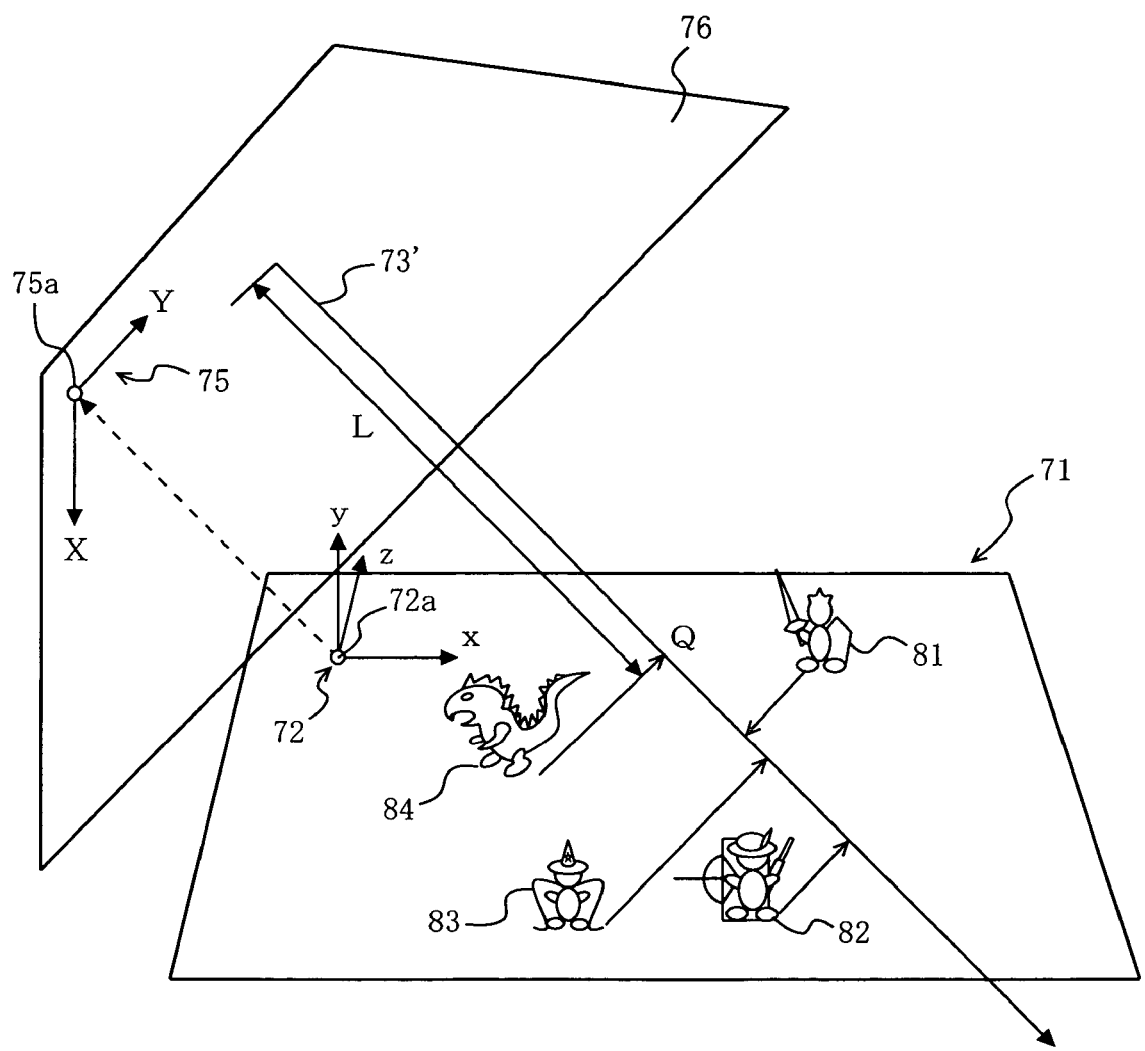
FIG. 4 is an illustration showing a frame setting plane set in a game space 71 shown FIG. 3.

FIG. 4 is an illustration showing a frame setting plane set in the game space shown in FIG. 3. In FIG. 4, a frame setting plane 76 is set in the game space 71. The frame setting plane 76 is a plane on which the above-stated frames are set. The frame setting plane 76 is set so as to be perpendicular to the line of sight 73. Furthermore, in the present embodiment, the position of the frame setting plane 76 is set as follows. That is, for each selected object, a point of intersection of a coordinate axis 73' that is parallel to the line of sight 73 and a line drawn from the three-dimensional coordinate value of the selected object so as to be perpendicular to the coordinate axis 73' is first calculated (for the first enemy character 84, a point Q shown in FIG. 4 is calculated). Then, of those calculated points for all selected objects, one point having the smallest value on the coordinate axis 73' that runs positive in the direction of the line of sight 73 is specified. Then, the frame setting plane 76 is set at a position located in a direction reverse to the direction of the line of sight 73 and a predetermined distance L away from the specified point having the smallest value.

Also, in FIG. 4, a two-dimensional frame coordinate system 75 for indicating positions on the frame setting plane 76 is set. An origin 75a of the frame coordinate system 75 is set to a point to which an origin 72a of the world coordinate system 72 is projected on the frame setting plane 76. Specifically, a point of intersection of a line extending from the origin 72a in parallel with the line of sight 73 and the frame setting plane 76 is taken as the origin 75a. The X axis and the Y axis of the frame coordinate system 75 are respectively set in the predetermined directions. It is assumed in the present embodiment that the X axis coincides with the width of the display area, while the Y axis coincides with the height of the display area. Here, in order to clearly distinguish the world coordinate system 72 from the frame coordinate system 75, the world coordinate system 72 is represented by lowercase alphabetical characters (x axis, y axis, and z axis), while the frame coordinate system 75 is represented by uppercase alphabetical characters (X axis and Y axis).

Figure 5:
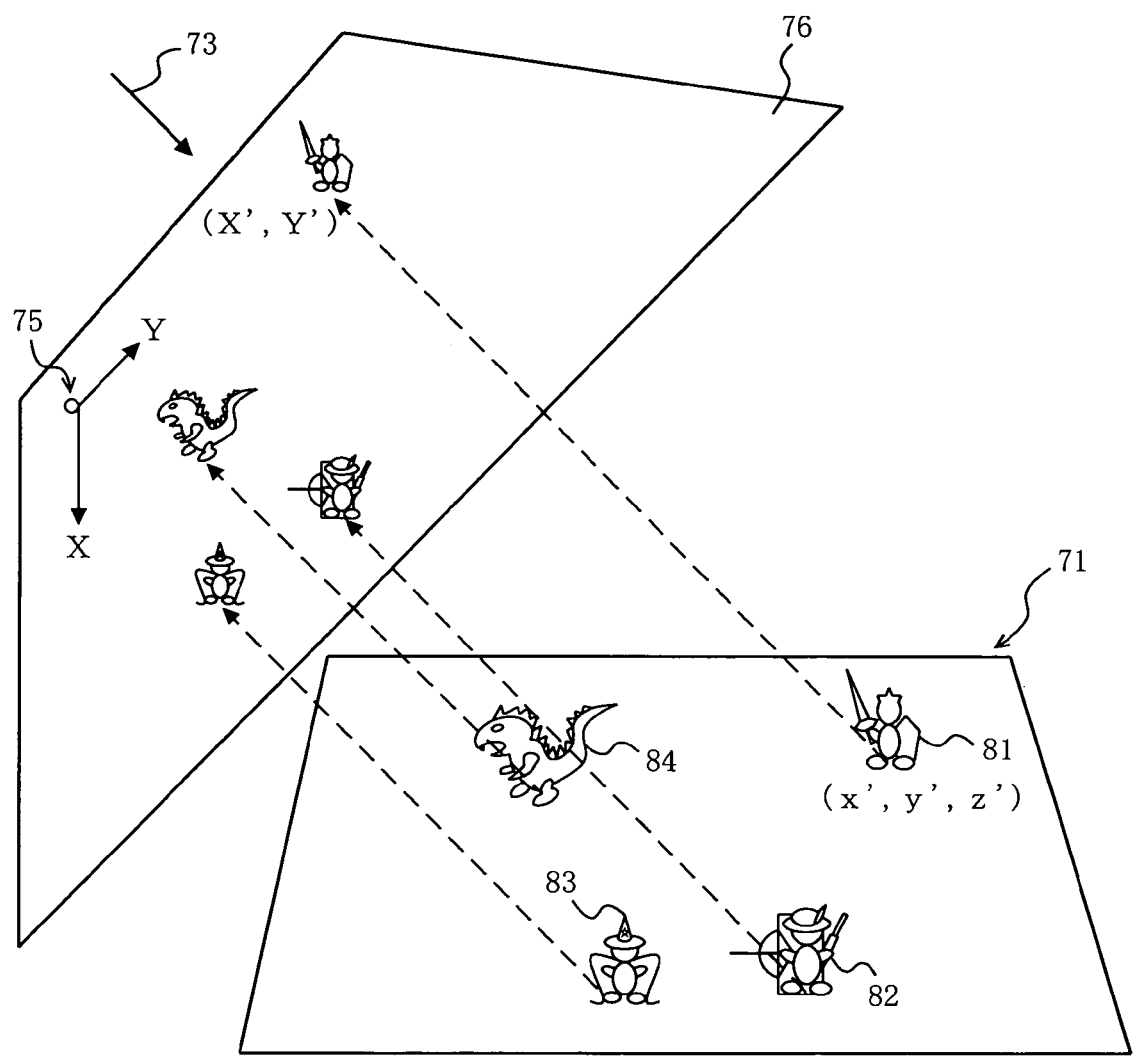
FIG. 5 is an illustration for describing a process of projecting a position of each selected object onto a frame setting plane 76.

FIG. 5 is an illustration for describing a process of projecting the position of each selected object onto the frame setting plane. After the frame setting plane 76 and the frame coordinate system 75 are set, the position of each selected object is projected onto the frame setting plane 76. Each selected object is projected onto the frame setting plane 76 at a point of intersection of the frame setting plane 76 and a straight line extending along the line of sight 73 from the point representing the world coordinate value. Here, a coordinate value of the point at which a selected object is projected on the frame setting plane 76 is referred to as a frame coordinate value. In the present embodiment, the game machine 3 represents the frame coordinate value based on the two-dimensional frame coordinate system 75. Specifically, a coordinate value of a point at which the player character 81 having a world coordinate value (x', y', z') is projected onto the frame setting plane 76 is calculated as a frame coordinate value (X', Y') of the player character 81. Also, a frame coordinate value of each of the other player characters 82 and 83 and the first enemy character 84 is calculated in a manner similar to that for the frame coordinate value of the player character 81. As such, in the present embodiment, the three-dimensional world coordinate system 72 is converted to the two-dimensional frame coordinate system 75 to represent a frame coordinate value, thereby allowing a frame setting process to be easily performed. In another embodiment, the frame coordinate value may be represented based on the world coordinate system 72.

Figure 6:
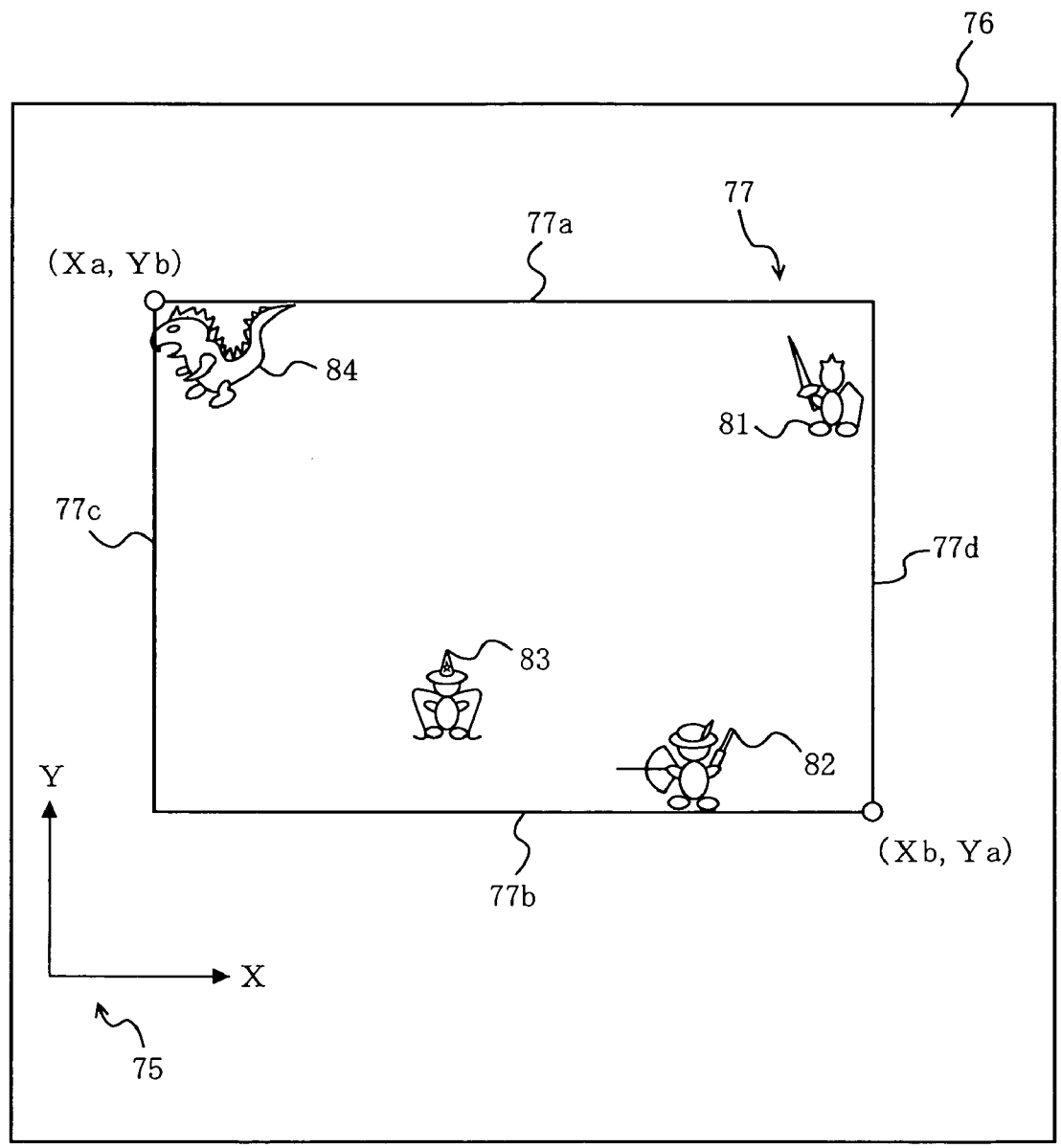
FIG. 6 is an illustration showing a frame set on the frame setting plane 76.

FIG. 6 is an illustration showing frames set on the frame setting plane 76. In FIG. 6, the frame setting plane 76 is viewed in the direction of the line of sight 73. After calculating the frame coordinate value of each selected object, the game machine 3 sets a first frame 77 on the frame setting plane 76. Note that the first frame 77 is virtually set on the frame setting plane 76. Therefore, the first frame 77 is not displayed on the game screen. In the present embodiment, the first frame 77 has a shape of a rectangle (including a square). Furthermore, the first frame 77 is a rectangle having two sides parallel to the X axis of the frame coordinate system 75 and the other two sides parallel to the Y axis thereof. Therefore, in an actual process, the first frame 77 can be represented by using the frame coordinate values indicating positions of two vertices located on a diagonal line in the rectangle ((Xa, Yb) and (Xb, Ya) in FIG. 6). With this, the position of an upper side 77a of the first frame 77a can be represented by Yb, the position of a lower side 77b thereof can be represented by Ya, the position of a left side 77c thereof can be represented by Xa, and the position of a right side 77d thereof can be represented by Xb. In the following description, the X axis direction is also referred to as a width direction, while the Y axis direction is also referred to as a height direction.

The first frame 77 is set so that the points indicated by the frame coordinate values of the selected objects are contained in the first frame 77. That is, the first frame 77 is set so that the selected objects are located inside of the first frame 77 when viewed from the direction of the line of sight 73. Furthermore, in the course of the game process, the game machine 3 deforms the first frame 77 by independently moving each side according to the movement of each selected object. This process in the present embodiment is described below in detail with reference to FIGS. 7 through 10.

Figure 7:
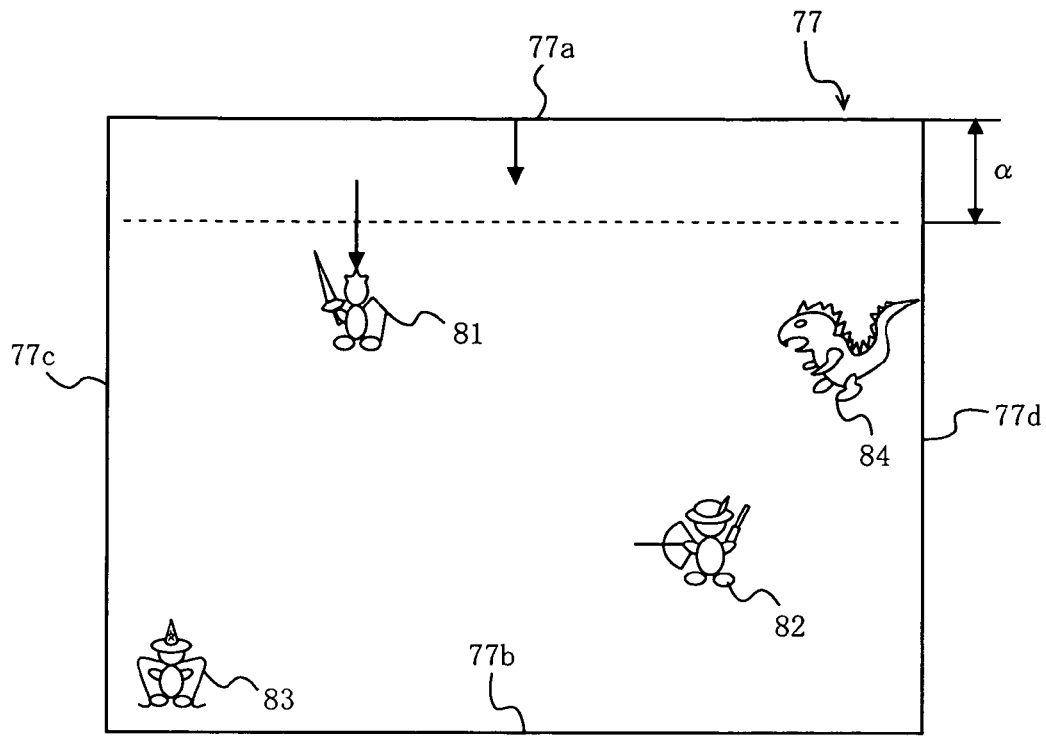
FIG. 7 is an illustration showing a state in which the upper side of a first frame 77 is moved.

FIG. 7 is an illustration showing a state in which the upper side of the first frame 77 is moved. It is assumed in FIG. 7 that the player character 81 is moving downward in FIG. 7. With the player character 81 moving downward, if an area that is inside of the first frame 77 and a predetermined distance á away from the upper side 77a of the first frame 77 includes no selected object, the upper side 77a of the first frame 77 is moved toward the inside of the first frame 77 (downward in FIG. 7) by a predetermined distance k (k<á).

Figure 8:
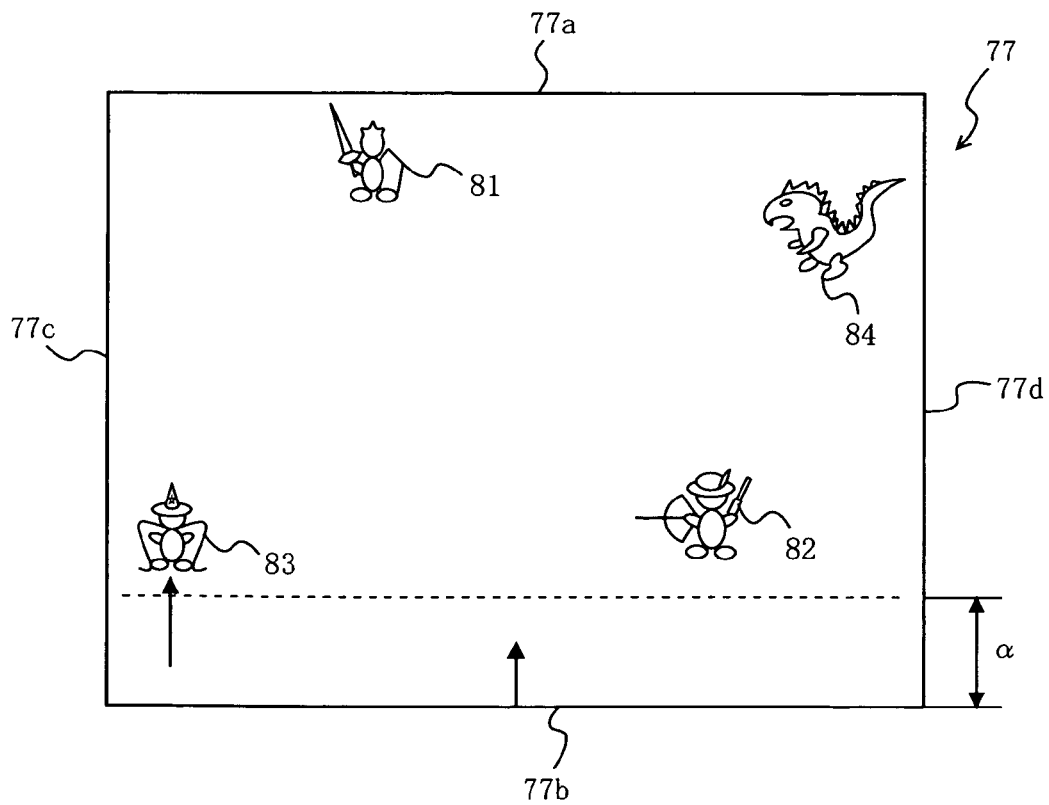
FIG. 8 is an illustration showing a state in which the lower side of the first frame 77 is moved.

FIG. 8 is an illustration showing a state in which the lower side of the first frame 77 is moved. It is assumed in FIG. 8 that the player character 83 is moving upward in FIG. 8. As with FIG. 7, if an area that is inside of the first frame 77 and the predetermined distance á away from the lower side 77a of the first frame 77 includes no selected object, the lower side 77b of the first frame 77 is moved toward the inside of the first frame 77 (upward in FIG. 7) by the predetermined distance k.

Figure 9:
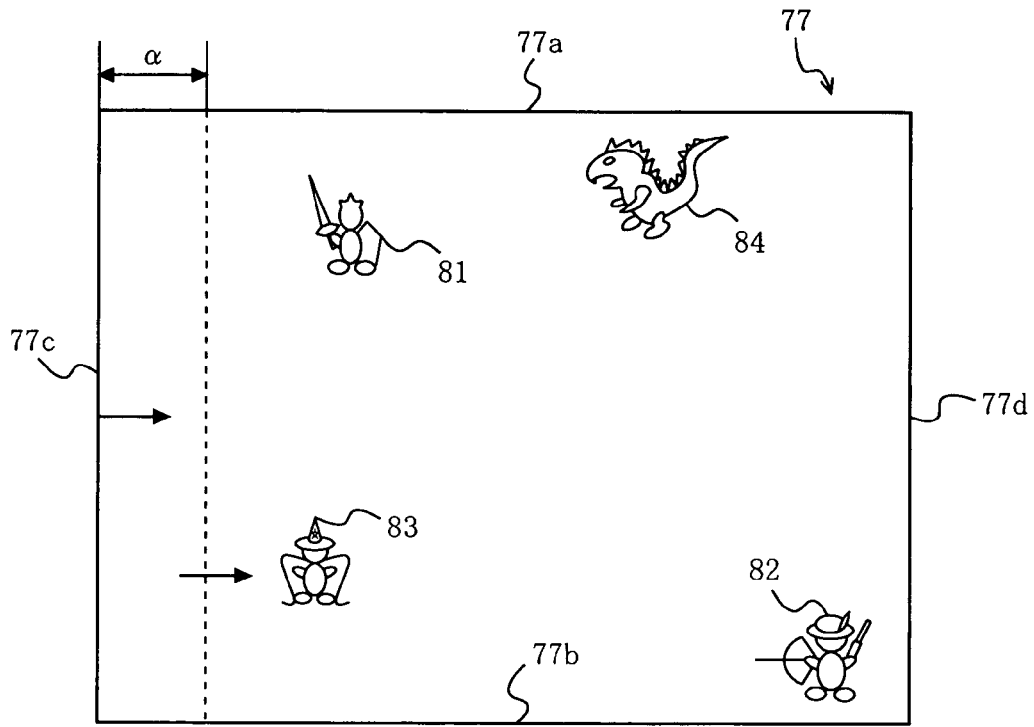
FIG. 9 is an illustration showing a state in which the left side of the first frame 77 is moved.
Figure 10:
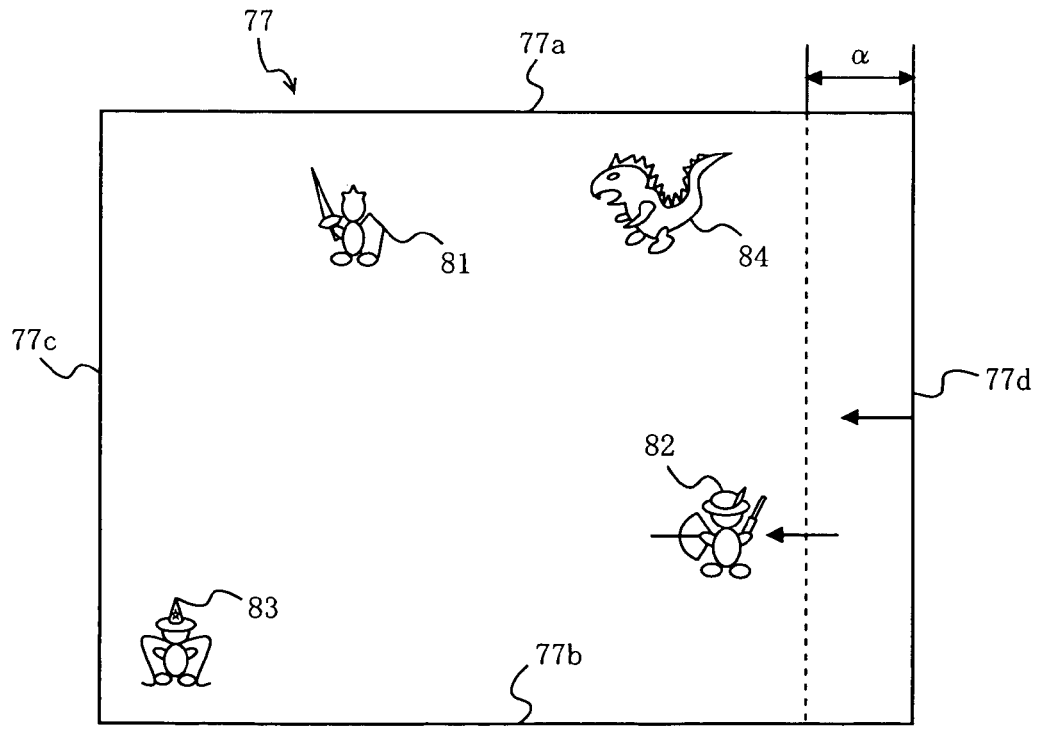
FIG. 10 is an illustration showing a state in which the right side of the first frame 77 is moved.

FIG. 9 is an illustration showing a state in which the left side of the first frame 77 is moved. FIG. 10 is an illustration showing a state in which the right side of the first frame 77 is moved. The cases in FIGS. 9 and 10 are similar to those in FIGS. 7 and 8. That is, after a selected object moves, if an area that is inside of the first frame 77 and the predetermined distance á away from the left side 77c or the right side 77d of the first frame 77 includes no selected object, the left side 77c or the right side 77d of the first frame 77 is moved toward the inside of the first frame 77 by the predetermined distance k.

Also, if a selected object is moving toward the outside of the first frame 77, the relevant side of the first frame 77 is moved toward the outside of the frame in accordance with the movement. For example, if the player character is going over the upper side 77a toward the outside (upward in FIG. 7), the upper side 77a is moved outward (upward in FIG. 7) so that the player character is contained in the first frame 77. Also, if the player character is going over the lower side 77b toward the outside (downward in FIG. 7), the lower side 77b is moved outward (downward in FIG. 7). Furthermore, if the player character is going over the left side 77c toward the outside (leftward in FIG. 7), the left side 77c is moved outward (leftward in FIG. 7). Still further, if the player character is going over the right side 77d toward the outside (rightward in FIG. 7), the right side 77d is moved outward (rightward in FIG. 7). Specifically, the game machine 3 causes a side of the first frame 77 to move to the position of the selected object that is moving toward the outside of the first frame 77. With this, the game machine 3 controls the first frame 77 so that the selected objects are positioned inside of the first frame 77. Also, each side of the first frame 77 is moved independently according to the movement of a selected object. As will be described further below, the display area is determined so that an area defined by the first frame 77 is displayed. Therefore, the selected objects are always displayed on the game screen.

Figure 11:
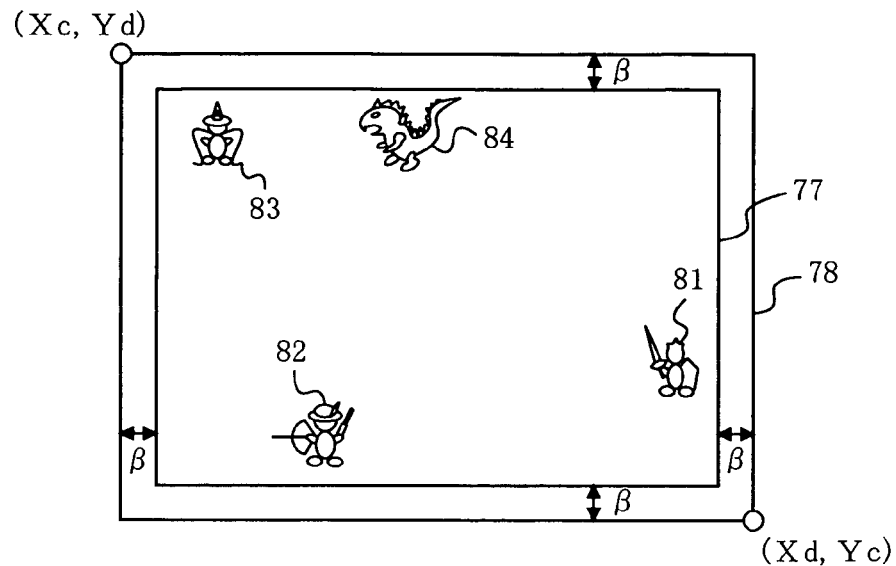
FIG. 11 is an illustration showing the first frame 77 and a second frame 78.

Upon setting the first frame 77, the game machine 3 sets a second frame based on the first frame 77. FIG. 11 is an illustration showing the first frame and the second frame. In FIG. 11, a second frame 78 is obtained by providing a margin of a predetermined distance â to the first frame 77. Specifically, the second frame 78 is obtained by extending the first frame 77 outward by the predetermined distance â. As evident from FIG. 11, at least the predetermined distance â is provided between the second frame 78 and each selected object. The display area can be determined so that at least an area defined by the second frame 78 is displayed. With this, the selected objects are displayed at least the predetermined distance â away from the edge of the game screen. This can prevent each selected object from being displayed at the edge of the game screen.

In FIGS. 6 through 11 described above, the shapes of the first frame 77 and the second frame 78 are approximately similar to the shape of a screen area of the screen of the television 2 on which a game image of the game space 71 is displayed. However, the shapes of the first frame 77 and the second frame 78 are set according to the positions of the selected objects, and therefore are not necessarily similar to the shape of the screen area. That is, an aspect ratio (=width/height) of each of the first frame 77 and the second frame 78 is variable according to the positions of the selected objects, and may not be equal to the aspect ratio of the screen area, which has a predetermined constant value. Therefore, after setting the second frame 78, the game machine 3 corrects the aspect ratio of the second frame 78 to the aspect ratio of the screen area.

Figure 12A:
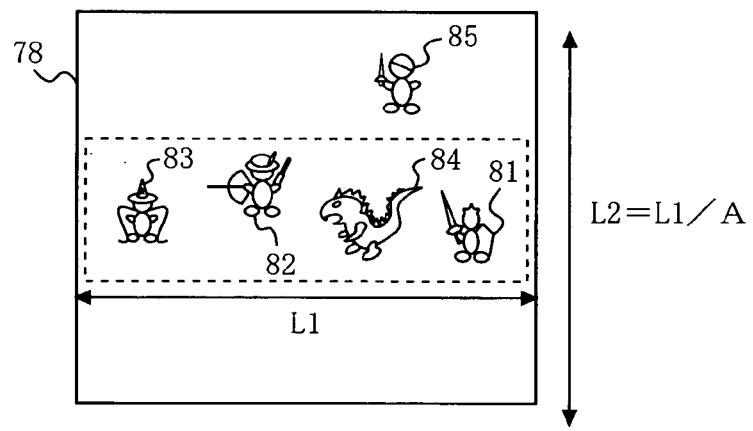
FIGS. 12A and 12B are illustrations for describing a process of correcting an aspect ratio of the second frame 78.
Figure 12B:
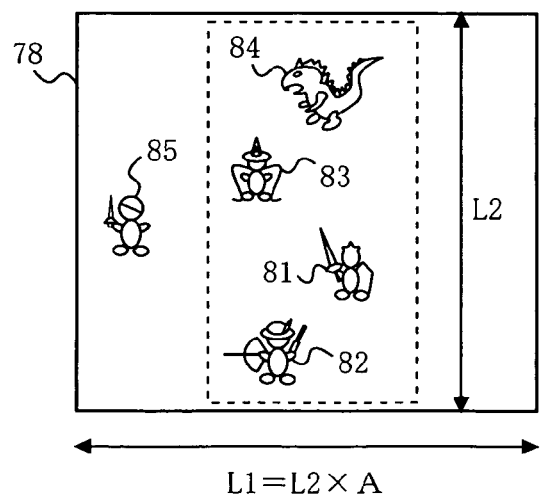

FIGS. 12A and 12B are illustrations for describing a process of correcting the aspect ratio of the second frame 78. FIG. 12A is an illustration for describing the process when the second frame 78 has a width longer than its height (has a large aspect ratio). In FIGS. 12A and 12B, a dotted line represents the second frame 78 before correction. As shown in FIG. 12A, when the second frame 78 has a width longer than its height (has a large aspect ratio), the height of the second frame 78 is corrected. Specifically, when the aspect ratio of the display area is A and the width of the second frame 78 is L1, correction is made so that a height L2 of the second frame 78 after correction becomes L2=L1/A. Furthermore, the height of the second frame 78 is corrected so as to be extended upward and downward equally.

On the other hand, FIG. 12B is an illustration for describing the process when the second frame 78 has a height longer than its width (has a small aspect ratio). As shown in FIG. 12B, when the second frame 78 has a height longer than its width (has a small aspect ratio), the width of the second frame 78 is corrected. Specifically, correction is made so that the width L1 of the second frame 78 after correction becomes L1=L2× A. Furthermore, the width of the second frame 78 is corrected so as to be extended rightward and leftward equally.

In FIGS. 12A and 12B, the second enemy character 85, which is a non-selected object, is shown. As shown in FIGS. 12A and 12B, after the aspect ratio is corrected, the non-selected object may be contained in the second frame 78, but the frame setting process is not related to the position of the non-selected object. Therefore, in the frame setting process, no consideration is given to the position of the non-selected object.

With the above processes, the second frame 78 for use in determining a display area is set on the frame setting plane 76. Upon setting the second frame 78, the game machine 3 determines a view volume based on the second frame 78. The view volume represents a range of a game space to be displayed on a screen, or a space defined by vertices of a near clip plane and vertices of a far clip plane. That is, the view volume is determined by determining each vertex of the near clip plane and the far clip plane based on the second frame 78. Specifically, points of intersection of straight lines extending in a predetermined direction from the respective vertices of the second frame 78 and a plane perpendicular to the line of sight at an ear clipping position are set as vertices of a near clipping plane, and points of intersection of the straight lines and a plane perpendicular to the line of sight at a far clipping position are set as vertices of a far clipping plane. With the view volume being determined in the above-described manner, the area defined by the second frame 78 when viewed from the viewing point is displayed as a game image. Typical schemes for determining the display area are parallel projection and perspective projection. A process of determining the display area through parallel projection or perspective projection is described below in detail.

Figure 13A:
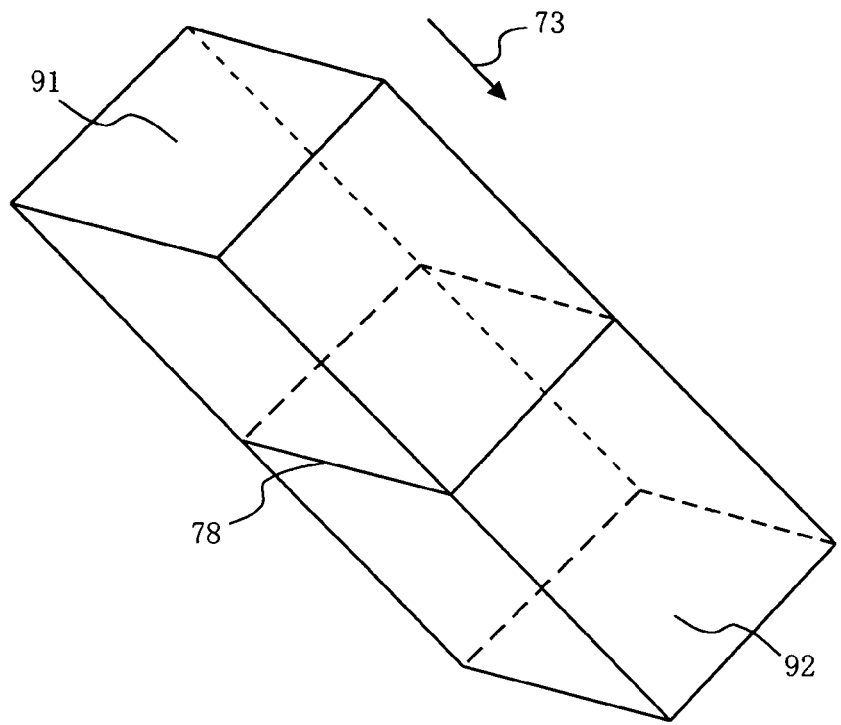
FIGS. 13A and 13B are illustrations for describing processes of determining a display area.
Figure 13B:
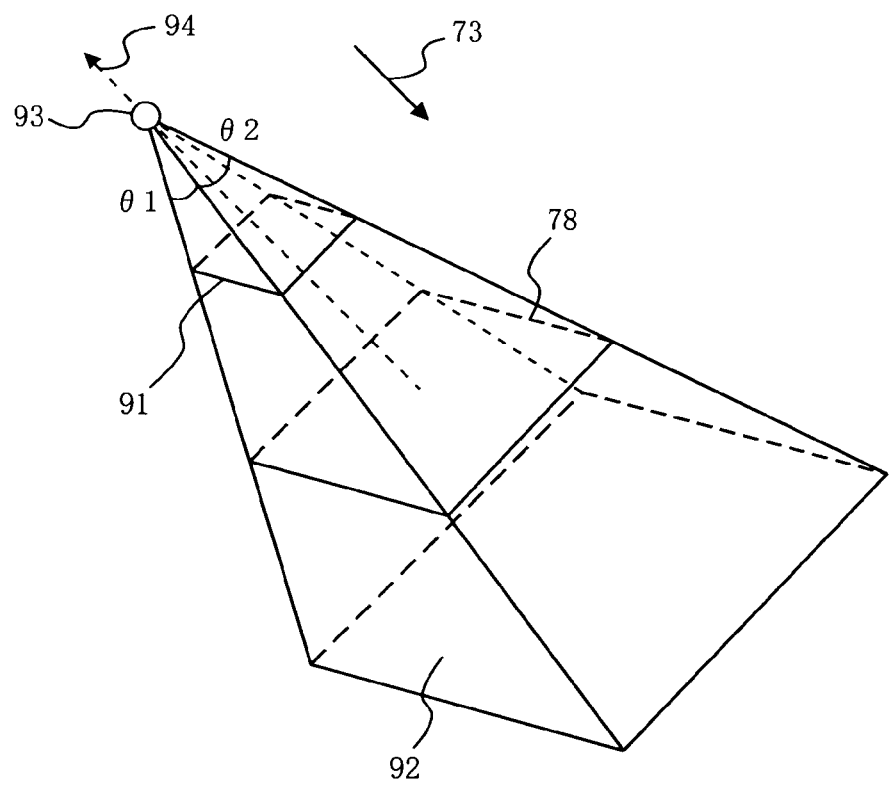

FIGS. 13A and 13B are illustrations for describing processes of determining a display area. FIG. 13A is a process of determining a display area through parallel projection. In parallel projection, points of intersection of straight lines extending from the respective vertices of the second frame 78 along the line of sight 73 and a plane perpendicular to the line of sight at the near clipping position are set as vertices of a near clipping plane 91. Also, points of intersection of the straight lines and a plane perpendicular to the line of sight at the far clipping position are set as vertices of a far clipping plane 92. With this, in the game space 71, an area defined by a rectangular parallelepiped with the near clipping plane 91 and the far clipping plane 92 being taken as its bases are determined as the display area, that is, the view volume.

FIG. 13B is an illustration for describing a process of determining a display area through perspective projection. In perspective projection, the position of a viewing point 93 is first determined. The viewing point 93 represents a position of a virtual camera set in the game space 71. That is, the position of the viewing point 93 is determined based on the second frame 78. Specifically, the position of the viewing point 93 is determined at a point that is positioned on a straight line extending from the center of the second frame 78 in a direction reverse to the line of sight 73 and is defined by an angle of view è1 in the X direction. Alternatively, in place of the angle of view è1 in the X direction, the position of the viewing point can be determined by using an angle of view è2 in the Y direction. After the viewing point is determined in the above-described manner, points of intersection of straight lines connecting the vertices of the second frame 78 and the viewing point together and a plane perpendicular to the line of sight at the near clipping position are set as vertices of a near clipping plane 91. Also, points of intersection of the straight lines and a plane perpendicular to the line of sight at the far clipping position are set as vertices of a far clipping plane 92. With this, the display area, that is, the view volume, is determined.

In the above description, if no correction is made to the aspect ratio of the second frame 78, the shapes of the near clipping plane and the far clipping plane of the view volume are similar to the shape of the second frame 78 before an aspect ratio correcting process is performed. Therefore, the shapes (aspect ratio) of the near clipping plane and the far clipping plane might be different from the shape (aspect ratio) of the screen area on which the game image in the game space 71 is displayed. If they are different from each other, the game image of the area included in the view volume is displayed as being deformed according to the shape of the screen area. For example, if the shape of the second frame 78 has a width longer than its height, the game image of the area included in the view volume is displayed as being extended in the height direction. Similarly, if the shape of the second frame 78 has a height longer than its width, for example, the game image of the area included in the view volume is displayed as being extended in the width direction. Therefore, if no aspect ratio correcting process is performed, the game image might become an image extended in the height or width direction, and this is not easy to view. By contrast, in the present embodiment, by correcting the aspect ratio, the shape of the near clipping plane and the far clipping plane are always similar to that of the above screen area. Therefore, the game image that is easy to view can be always displayed.

Next, with reference to FIGS. 14 through 19, a game process performed by the game machine 3 is described. When the game machine 3 is powered on, the CPU 31 of the game machine 3 executes the boot program stored in the boot ROM not shown to initialize each unit, typically the work memory 32. Then, the game program stored in the optical disc 4 is read via the optical disc drive 37 into the work memory 32, thereby starting the execution of the game program. As a result, with the game space being displayed on the television 2 via the GPU 36, the game is started. A flowchart shown in FIG. 15 shows processes after the above-described process.

Figure 14:
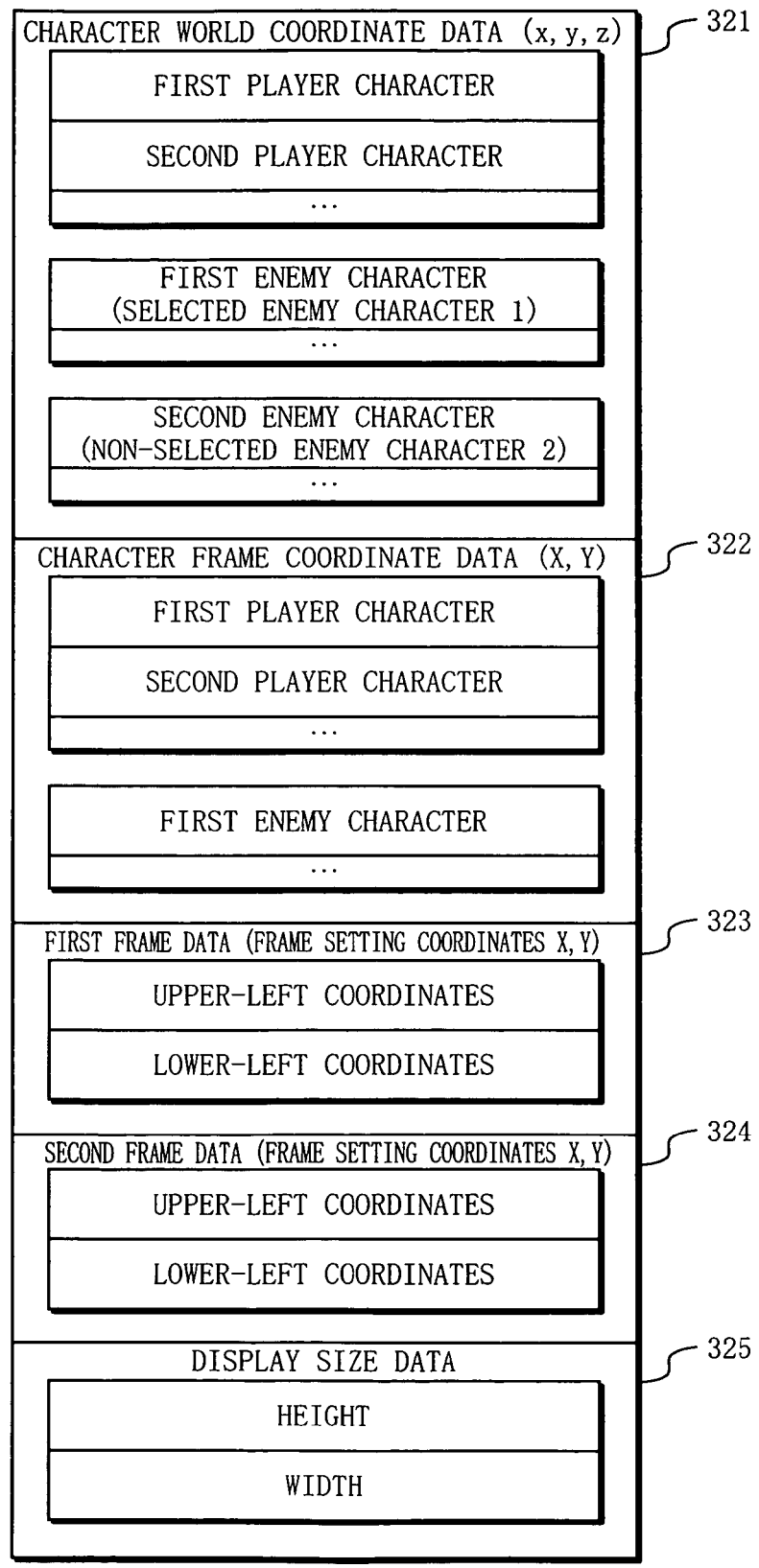
FIG. 14 is an illustration showing a memory map of a work memory 32.

Prior to details of the game process, data stored in the work memory 32 for use in the game process is described. FIG. 14 is an illustration showing a memory map of the work memory 32. The work memory 32 typically has stored therein character world coordinate data 321, character frame coordinate data 322, first frame data 323, second frame data 324, and display size data 325. In FIG. 14, only data related to the process according to the present invention is shown, and other data (for example, image data of objects) is not shown.

The character world coordinate data 321 indicate a position of each character (object) in the world coordinate system 72, that is, a world coordinate value (x, y, z) thereof. The character world coordinate data 321 includes data indicative of world coordinate values of the first through three player characters 81 through 83 and also the world coordinate values of the first and second enemy characters 84 and 85. That is, the character world coordinate data 321 also includes world coordinate values of non-selected objects.

The character frame coordinate data 322 indicate a position of each selected object in the frame coordinate system 75, that is, a frame coordinate value (X, Y) thereof. The character frame coordinate data 322 includes the frame coordinate values of the first through third player characters 81 through 83 and the first enemy character 84, that are selected objects.

The first frame data 323 indicates the first frame 77. As described above, in the present embodiment, the frame has a rectangular shape, and therefore the position and the size of the first frame 77 in the frame coordinate system 75 can be represented by the positions of two vertices on a diagonal line. Here, the coordinate value of the upper-left vertex ((Xa, Yb) shown in FIG. 6) and the coordinate value of the lower-right vertex ((Xb, Ya) shown in FIG. 6) are used to represent the first frame 77.

The second frame data 324 indicates the second frame 78. As with the first frame 77, the second frame 78 can be represented by the positions of two vertices on a diagonal line. Here, a coordinate value of the upper-left vertex (Xc, Yd) and a coordinate value of the lower-right vertex (Xd, Yc) are used to represent the second frame 78.

The display size data 325 indicates the height and the width of the second frame 78. Data indicative of the height L2 of the second frame 78 is obtained by the above-described second frame data 324. Specifically, L2=Yd−Yc. Similarly, the length L1 of the second frame 78 can be obtained from the above-described second frame data 324: L1=Xd−Xc.

The game process is described below in detail. FIG. 15 is a main flowchart showing the game process to be performed in the game system according to the present embodiment. First, in step S1, a game process initializing process is performed. Specifically, the direction of the line of sight 73, an initial position of each of the player characters 81 through 83 in the game space 71, an initial position of each of the enemy characters (such as the first enemy character 84 and the second enemy character 85), and an initial position of each of the frames (the first frame 77 and the second frame 78) are typically set. Here, the initial position of each frame is set at a point predetermined in the scheme described with reference to FIGS. 6, 11, 12A, and 12B based on the initial positions of each of the player characters 81 through 83 and the first enemy character 84, which are selected objects. Also, the data initially set in step S1 is written in the work memory 32. The initial positions of the player characters 81 through 83 and the initial positions of the enemy characters are written in the work memory 32 as the character world coordinate data 321. Also, the initial positions of the first frame 77 and the second frame 78 are written in the work memory 32 as the first frame data 323 and the second frame data 324, respectively.

When the initial setting in step S1 is completed, processes in steps S2 through S7 are repeated thereafter. A loop of steps S2 through S7 is a process performed during one frame of the game image. First, in step S2, the CPU 31 controls a movement of each of the player characters 81 through 83 in the game space 71 based on an operation input from each player through the controller 6. Specifically, based on an operation input from the first controller, the position of the first player character 81 in the game space 71 is determined. That is, a world coordinate value of the player character 81 is calculated, and then the character world coordinate data 321 in the work memory 32 is updated to the calculated world coordinate value. Similarly, the position of the second player character 82 in the game space 71 is determined based on an operation input from the second controller, while the position of the third player character 83 in the game space 71 is determined based on an operation input from the third controller.

Next, in step S3, the CPU 31 controls the movement of each enemy character in the game space 71. Specifically, according to a predetermined algorithm, the position of each enemy character in the game space 71 is determined. That is, a world coordinate value of each enemy character is calculated, and then the character world coordinate data 321 in the work memory 32 is updated to the calculated world coordinate value.

In steps S2 and S3, it is assumed that the concept of "movement of a character" includes "addition of a character" and "deletion of a character". That is, in steps S2 and S3, a new character may appear in the game space 71, or the existing character may disappear from the game space 71. Also, conditions of addition or deletion of a character may be arbitrary. For example, a new enemy character may appear on condition that a player character gets a particular item. Also, the existing player character may disappear on condition that a physical fitness value (which is assumed to be predetermined as attribute data) of that player character becomes 0.

Figure 17:
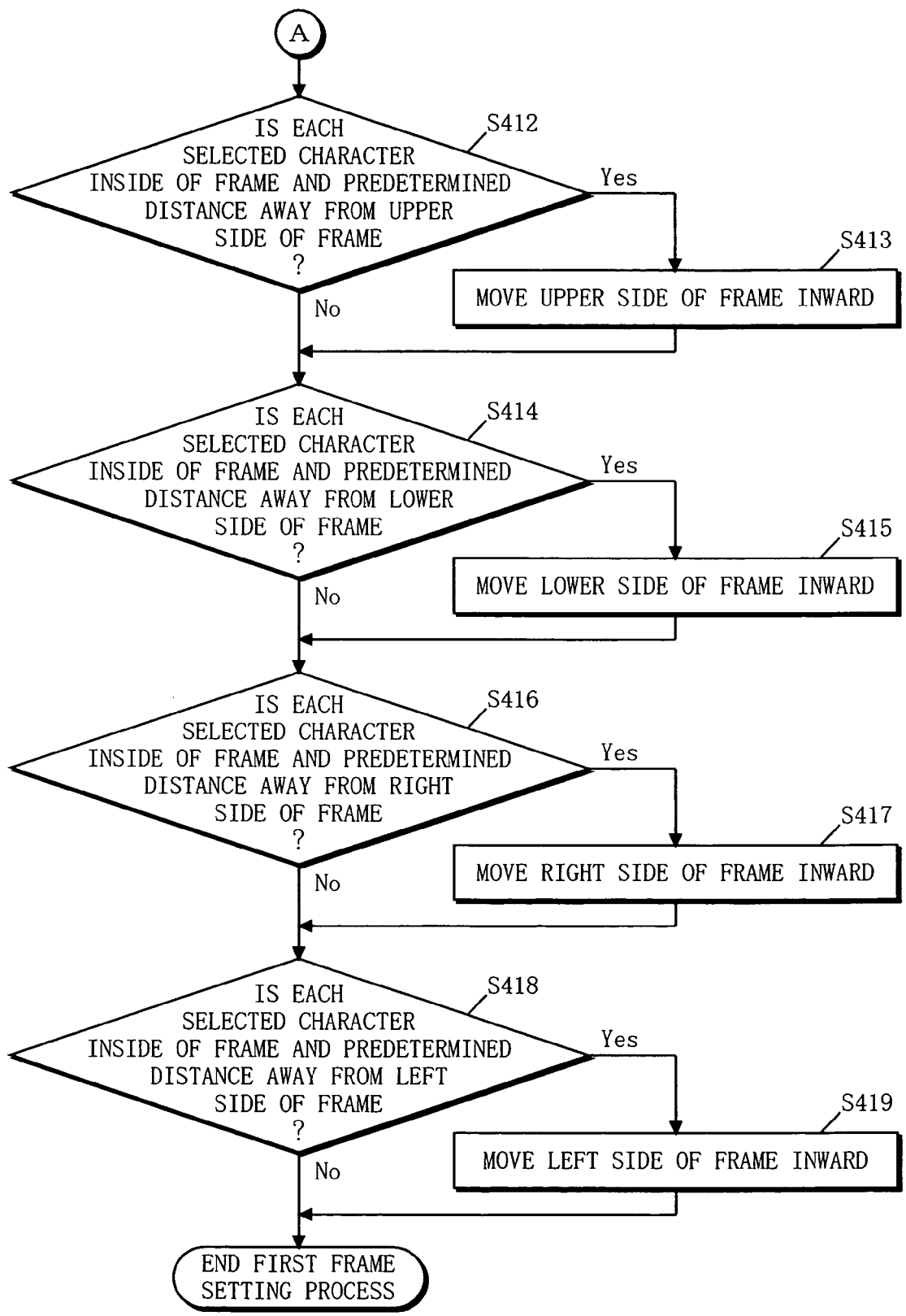

With the above steps S2 and S3, the position of each character in the next frame (a game image displayed in step S7) is determined. Then, the frames are set in the next steps S4 and S5. Based on the frames, the view volume is set in step S6. Then, the game image of the set view volume is displayed in step S7. Referring back to step S4, a first frame setting process is performed. FIGS. 16 and 17 are a flowchart showing a flow of the detailed process in step S4 shown in FIG. 15. In the first frame setting process the CPU 31 first sets, in step S401, the frame setting plane 76 in the game space 71 (refer to FIG. 4). At this time, the frame coordinate system 75 is also set.

Next, in steps S402 and S403, each selected character is projected onto the frame setting plane 76 set in step S401 (refer to FIG. 5). That is, in step S402, from the world coordinate value of a selected character, the CPU 31 calculates a frame coordinate value of that selected character. Specifically, based on the world coordinate value stored in the work memory 32 of a selected character, a frame coordinate value of that selected character is calculated. The calculated frame coordinate value of each selected character is written in the work memory 32 as the character frame coordinate data 322. Next, it is determined in step S403 whether frame coordinate values have been calculated for all of the selected characters. If it is determined that frame coordinate values have been calculated for all of the selected characters, the procedure goes to step S404. On the other hand, if it is determined that frame coordinate values have not yet been calculated for all of the selected characters, the procedure returns to step S402. That is, the CPU 31 repeats the processes in steps S402 and S403 until the frame coordinate values of all of the selected characters have been calculated.

With the above processes in steps S402 and S403, the position of each selected character on the frame setting plane 76 is calculated. This makes it possible to determine a positional relation between the selected characters and the first frame 77 on the frame setting plane 76 (refer to FIG. 6). Now, in the following steps S404 through S419, it is determined whether the first frame 77 is required to be deformed, and if required, then the first frame 77 is deformed. First, in steps S404 through S411, a process of deforming the first frame 77 in an expanding manner is performed. Then, in steps S412 through S419, a process of deforming the first frame 77 in a reducing manner is performed.

First, in step S404, it is determined whether a selected character outside of the upper side 77a of the first frame 77 (here, in the positive direction of the Y axis) is present. Specifically, the CPU 31 compares Yb in the upper-left coordinates (Xa, Yb) of the first frame data 323 stored in the work memory 32 with the Y coordinate of each selected character in the character frame coordinate data 322 stored in the work memory 32. With this, it is determined whether a selected character whose Y coordinate is larger than Yb is present. If such a selected character is present, the selected character is determined as being outside of the first frame 77, and then a process in step S405 is performed. On the other hand, if no such selected character is present, it is determined that no selected character is outside of the first frame 77, and then a process in step S406 is performed.

Alternatively, in the above step S404, it may be determined whether a selected character outside of the upper side 77a of the first frame 77 by a predetermined distance is present. This reduces the frequency of moving the first frame 77, thereby reducing the frequency of moving the display area. Therefore, the game screen can be displayed so as to be easy to view. The same goes for steps S406, S408, and S410, which will be described further below.

In step S405, the upper side 77a is moved. Specifically, the upper side 77a is moved to the position of the selected character determined as being outside of the first frame 77. That is, Yb of the first frame data 323 stored in the work memory 32 is updated to the Y coordinate of that selected character. After the process in step S405, the process in step S406 is performed.

In step S406, it is determined whether a selected character outside of the lower side 77b of the first frame 77 (here, in the negative direction of the Y axis) is present. A specific determining scheme is similar to that in step S404. That is, Ya of the lower-right coordinates (Xb, Ya) of the first frame data 323 is compared with the Y coordinate of each selected character in the character frame coordinate data 322. Then, whether a selected character outside of the first frame 77 is present is determined depending on whether a selected character whose Y coordinate is smaller than Ya is present. If it is determined in step S406 that a selected character outside of the first frame 77 is present, a process in step S407 is performed. On the other hand, if it is determined that no selected character outside of the first frame 77 is present, a process in step S408 is performed.

In step S407, the lower side 77b is moved. Specifically, the lower side 77b is moved to the position of the selected character determined as being outside of the first frame 77. That is, Ya of the first frame data 323 is updated to the Y coordinate of that selected character. After the process in step S407, the process in step S408 is performed.

In step S408, it is determined whether a selected character outside of the right side 77d of the first frame 77 (here, in the positive direction of the X axis) is present. A specific determining scheme is similar to that in step S404. That is, Xb of the lower-right coordinates (Xb, Ya) of the first frame data 323 is compared with the X coordinate of each selected character in the character frame coordinate data 322. Then, whether a selected character outside of the first frame 77 is present is determined depending on whether a selected character whose X coordinate is larger than Xb is present. If it is determined in step S408 that a selected character outside of the first frame 77 is present, a process in step S409 is performed. On the other hand, if it is determined that no selected character outside of the first frame 77 is present, a process in step S410 is performed.

In step S409, the right side 77d is moved. Specifically, the right side 77d is moved to the position of the selected character determined as being outside of the first frame 77. That is, Xb of the first frame data 323 is updated to the X coordinate of that selected character. After the process in step S409, the process in step S410 is performed.

In step S410, it is determined whether a selected character outside of the left side 77c of the first frame 77 (here, in the negative direction of the X axis) is present. A specific determining scheme is similar to that in step S404. That is, Xa of the upper-left coordinates (Xa, Yb) of the first frame data 323 is compared with the X coordinate of each selected character in the character frame coordinate data 322. Then, whether a selected character outside of the first frame 77 is present is determined depending on whether a selected character whose X coordinate is smaller than Xa is present. If it is determined in step S410 that a selected character outside of the first frame 77 is present, a process in step S411 is performed. On the other hand, if it is determined that no selected character outside of the first frame 77 is present, a process in step S412 is performed.

In step S411, the left side 77c is moved. Specifically, the left side 77c is moved to the position of the selected character determined as being outside of the first frame 77. That is, Xa of the first frame data 323 is updated to the X coordinate of that selected character. After the process in step S411, the process in step S412 is performed.

The processes in steps S412 through S419 are related to deformation of the frame in a reducing manner. First, in step S412, it is determined whether every selected character is inside of the upper side 77a of the first frame 77 (here, in the negative direction on the Y axis) and a predetermined distance á away from the upper side 77a. Specifically, Yb of the upper-left coordinates (Xa, Yb) in the first frame data 323 is compared with the Y coordinate of each selected character in the character frame coordinate data 322. It is then determined whether the Y coordinate of every selected character is smaller than Yb−á. If it is determined that the Y coordinate of every selected character is smaller than Yb−á, it is determined that every selected character is located inside of and the predetermined distance á away from the upper side 77a, and then the process in step S413 is performed. On the other hand, if it is determined that at least one selected character has a Y coordinate value that is larger than Yb−á, it is determined that at least one selected character is located within the predetermined distance á from the upper side 77a, and then the process in step S414 is performed.

In step S413, the upper side 77a is moved (refer to FIG. 7). Specifically, the upper side 77a is moved toward the inside of the first frame 77 by the predetermined distance k. That is, Yb in the first frame data 323 is updated to a value obtained by subtracting k from Yb. After the process in step S413, the process in step S414 is performed.

In step S414, it is determined whether every selected character is inside of the lower side 77b of the first frame 77 (here, in the positive direction on the Y axis) and the predetermined distance á away from the lower side 77b. A specific determining scheme is similar to that in step S412. That is, Ya of the lower-right coordinates (Xb, Ya) in the first frame data 323 is compared with the Y coordinate of each selected character in the character frame coordinate data 322. It is then determined whether the Y coordinate of every selected character is larger than Ya+á. If it is determined that every selected character is located inside of and the predetermined distance á away from the lower side 77b, the process in step S415 is performed. On the other hand, if it is determined that at least one selected character is located within the predetermined distance á from the lower side 77b, the process in step S416 is performed.

In step S415, the lower side 77b is moved (refer to FIG. 8). Specifically, the lower side 77b is moved toward the inside of the first frame 77 by the predetermined distance k. That is, Ya in the first frame data 323 is updated to a value obtained by adding k to Ya. After the process in step S415, the process in step S416 is performed.

In step S416, it is determined whether every selected character is inside of the right side 77d of the first frame 77 (here, in the negative direction on the X axis) and the predetermined distance á away from the right side 77d. A specific determining scheme is similar to that in step S412. That is, Xb of the lower-right coordinates (Xb, Ya) of the first frame data 323 is compared with the X coordinate in each selected character in the character frame coordinate data 322. Then, it is determined whether every selected character is located inside of and the predetermined distance á away from the right side 77d depending on whether the X coordinate of every selected character is smaller than Xb−á. If it is determined in step S416 that every selected character is located inside of and the predetermined distance á away from the right side 77d, the process in step S417 is performed. On the other hand, if it is determined that at least one selected character is located within the predetermined distance á from the right side 77d, the process in step S418 is performed.

In step S417, the right side 77d is moved (refer to FIG. 9). Specifically, the right side 77d is moved toward the inside of the first frame 77 by the predetermined distance k. That is, Xb in the first frame data 323 is updated to a value obtained by subtracting k from Xb. After the process in step S417, the process in step S418 is performed.

In step S418, it is determined whether every selected character is inside of the left side 77c of the first frame 77 (here, in the positive direction on the X axis) and the predetermined distance á away from the left side 77c. A specific determining scheme is similar to that in step S412. That is, Xa of the upper-left coordinates (Xa, Yb) in the first frame data 323 is compared with the X coordinate of each selected character in the character frame coordinate data 322. Then, it is determined whether every selected character is located inside of and the predetermined distance á away from the left side 77c depending on whether the X coordinate of every selected character is larger than Xa+á. If it is determined in step S418 that every selected character is located inside of and the predetermined distance á away from the left side 77*c*, the process in step S419 is performed. On the other hand, if it is determined that at least one selected character is located within the predetermined distance á from the left side 77*c*, the CPU 31 ends the first frame setting process.

In step S419, the left side 77*c* is moved (refer to FIG. 10). Specifically, the left side 77*c* is moved toward the inside of the first frame 77 by the predetermined distance k. That is, Xa in the first frame data 323 is updated to a value obtained by adding k to Xa. After the process in step S419, the CPU 31 ends the first frame setting process. With the above first frame setting process, the first frame 77 is set.

Figure 18:
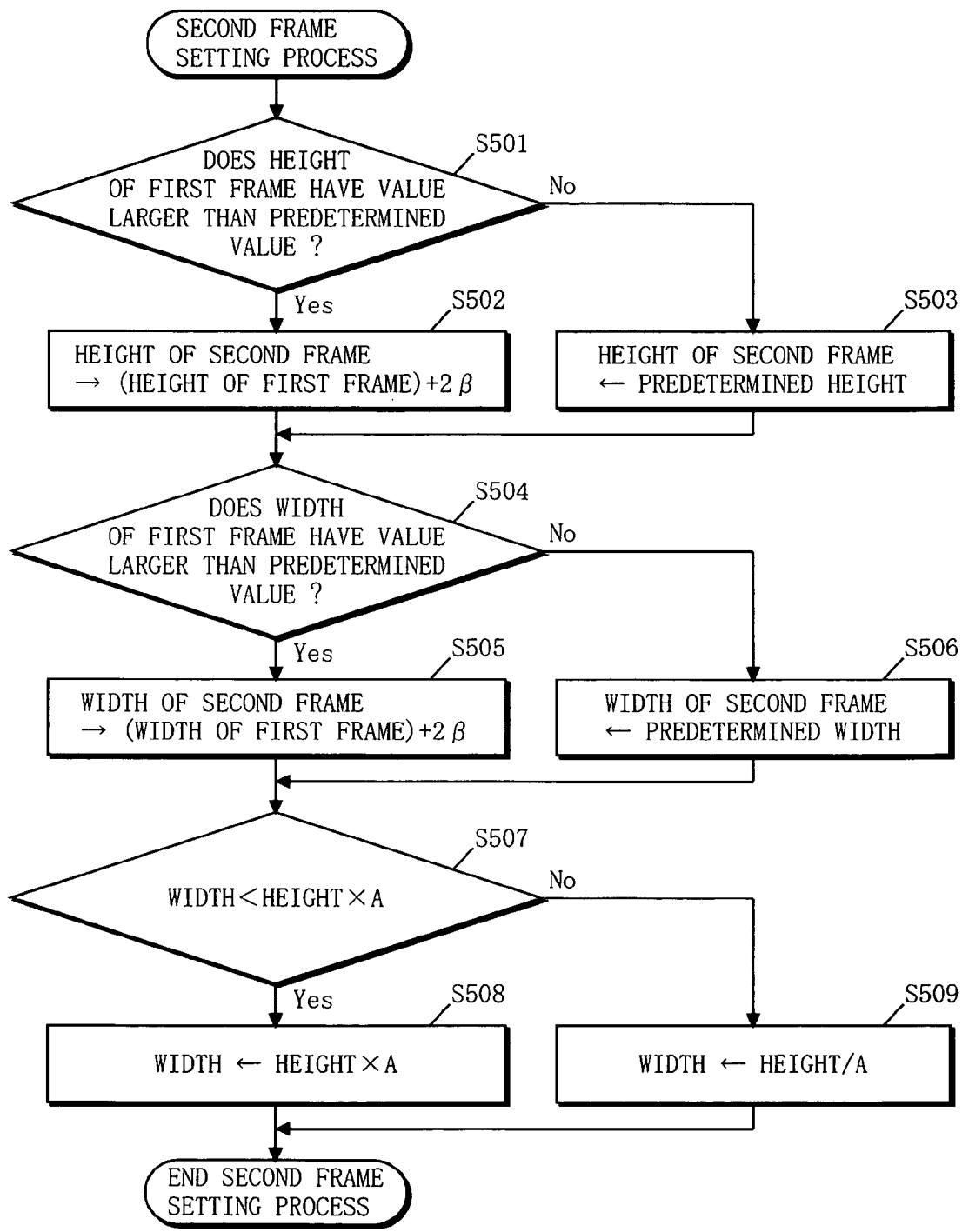
FIG. 18 is a flowchart showing a flow of a detailed process of step S5 shown in FIG. 15.

Returning to description of FIG. 15, after the first frame setting process (step S4), a second frame setting process is performed in step S5. The second frame setting process is a process for setting the second frame 78 based on the first frame 77 set in step S4. FIG. 18 is a flowchart showing a flow of the detailed process in step S5 shown in FIG. 15. In steps S501 through S506 of the second frame setting process, the second frame 78 is first set based on the first frame 77. Furthermore, in steps S507 through S509, the aspect ratio of the second frame 78 is corrected.

In FIG. 18, it is first determined in step S501 whether the height of the first frame 77 is larger than the predetermined value La. This determination is made based on Ya and Yb of the first frame data 323 stored in the work memory 32. That is, if Yb−Ya is larger than the predetermined value La, a process in step S502 is performed. On the other hand, if Yb−Ya is equal to or smaller than the predetermined value La, a process in step S503 is performed.

In step S502, the height of the second frame 78 is set to have a length obtained by extending the height of the first frame 77 by a predetermined distance (2×â) (refer to FIG. 11). Specifically, Yc of the second frame data 324 stored in the work memory 32 is updated to Ya−â. Also, Yd of the second frame data 324 is updated to Yb+â. After the process in step S502, a process in step S504 is performed.

In step S503, the height of the second frame 78 is set to have a predetermined height value. Here, the predetermined height value is a value indicative of a minimum height of the second frame 78 obtained by adding 2â to the predetermined value La. That is, when the predetermined height value is La', La'=La+2â. Therefore, when the height of the first frame 77 is smaller than the predetermined value La, the height of the second frame has a length obtained by extending the height of the first frame 77 having the predetermined value by the predetermined distance (2×â). Also at this time, the position of the second frame 78 is set so that the upper side 77*a* of the first frame 77 is extended in the height direction by a distance equal to a distance by which the lower side 77*b* thereof is extended in the height direction. Therefore, the upper side 77*a* and the lower side 77*b* are each extended in the height direction by {La'−(Yb−Ya)}/2. That is, Yc of the second frame data 324 is updated to Ya−{La'−(Yb−Ya)}/2. Also, Yd of the second frame data 324 is updated to Yb+{La−(Yb−Ya)}/2. After the process in step S503, the process in step S504 is performed.

Next, in step S504, it is determined whether the width of the first frame 77 is larger than a predetermined value Lb. This determination is made based on Xa and Xb of the first frame data 323 stored in the work memory 32. That is, if Xb−Xa is larger than the predetermined value Lb, a process in step S505 is performed. On the other hand, if Xb−Xa is equal to or smaller than the predetermined value Lb, a process in step S506 is performed.

In step S505, the width of the second frame 78 is set so as to have a length obtained by extending the width of the first frame 77 by the predetermined distance (2×â) (refer to FIG. 11). Specifically, Xc of the second frame data 324 stored in the work memory 32 is updated to Xa−â. Also, Xd of the second frame data 324 is updated to Xb+â. After the process in step S505, a process in step S507 is performed.

In step S506, the width of the second frame 78 is set to have a predetermined width value. Here, the predetermined width value is a value indicative of a minimum width of the second frame 78 obtained by adding 2â to the predetermined value Lb. That is, when the predetermined width value is Lb', Lb'=Lb+2â. Therefore, when the width of the first frame 77 is smaller than the predetermined value Lb, the width of the second frame 78 has a length obtained by extending the width of the first frame 77 having the predetermined value by the predetermined distance (2×â). Also at this time, the position of the second frame 78 is set so that the left side 77*c* of the second frame 78 is extended in the width direction by a distance equal to a distance by which the right side 77*d* thereof is extended in the width direction. Therefore, the left side 77*c* and the right side 77*d* are each extended in the width direction by {Lb'−(Xb−Xa)}/2. That is, Xc of the second frame data 324 is updated to Xa−{Lb'−(Xb−Xa)}/2. Also, Xd of the second frame data 324 is updated to Xb+{Lb−(Xb−Xa)}/2. After the process in step S506, the process in step S507 is performed.

In the present embodiment, with steps S501 through S506, the second frame 78 is restricted to have a height of La' and a width of Lb' at the minimum. This is to prevent the display area from being reduced too much to cause the game screen to be zoomed up too much. This prevents images of characters from being roughly displayed due to too much zooming-up.

With the processes in steps S501 through S506, the second frame 78 at least including an area obtained by extending the first frame 77 outward by the predetermined distance (2â) is set (refer to FIG. 11). The selected characters are contained in the first frame 77. Therefore, when the area in the second frame 78, which is obtained by extending the first frame 77, is displayed, the selected characters are not displayed on the edge of the display area. Thus, the selected characters can be displayed so as to be always easy to view. In steps S501 through S506, it is assumed that, when the second frame data 324 stored in the work memory 32 is updated, the display size data 325 is also updated accordingly.

In steps S507 through S509, a process of correcting the aspect ratio of the second frame 78 set in steps S501 through S506 is performed. First, in step S507, it is determined whether the second frame 78 has a shape longer in the height direction than the shape of the display area or has a shape longer in the width direction than the shape of the display area. Specifically, it is determined whether the width L1 of the second frame 78 has a value smaller than a product of the height L2 of the second frame 78 and an aspect ratio A of the display area. This determination is performed by using the display size data 325 stored in the work memory 32. That is, if L1<L2×A, it is determined that the second frame 78 has a shape longer in the height direction than the shape of the display area, and then a process in step S508 is performed. On the other hand, if L1>=L2×A, it is determined that the second frame 78 has a shape longer in the width direction than the shape of the display area, and then a process in step S509 is performed.

In step S508, the width of the second frame 78 is corrected. Specifically, the width is corrected so as to have a value equal to a product of the height L2 and the aspect ratio A of the display area (refer to FIG. 12B). With this, the width of the second frame 78, which has a shape whose height is longer than its width, is extended, thereby correcting the shape of the second frame 78 so as to have a shape similar to the shape of the display area. Furthermore at this time, the position of the second frame 78 is set so that its width is extended rightward and leftward equally. Specifically, when a difference between the width after correction and the width before correction is taken as S1, the X coordinate of each right vertex of the second frame 78 is moved rightward (in the positive direction on the X axis) by S1/2. Also, the X coordinate of each left vertex of the second frame 78 is moved leftward (in the negative direction on the X axis) by S1/2. That is, Xd of the second frame data 324 is updated to a value obtained by adding S1/2 to Xd before correction. Also, Xc of the second frame data 324 is updated to a value obtained by subtracting S1/2 from Xc before correction.

On the other time, in step S509, the height of the second frame 78 is corrected. Specifically, the height is corrected so as to have a value obtained by dividing the width L1 by the aspect ratio A of the display area (FIG. 12A). With this, the height of the second frame 78, which has a shape whose width is longer than its height, is extended, thereby correcting the shape of the second frame 78 so as to have a shape similar to the shape of the display area. Furthermore at this time, the position of the second frame 78 is set so that its width is extended upward and downward equally. Specifically, when a difference between the height after correction and the height before correction is taken as S2, the Y coordinate of each upper vertex of the second frame 78 is moved upward (in the positive direction on the Y axis) by S2/2. Also, the Y coordinate of each lower vertex of the second frame 78 is moved downward (in the negative direction on the Y axis) by S2/2. That is, Yd of the second frame data 324 is updated to a value obtained by adding S2/2 to Yd before correction. Also, Yc of the second frame data 324 is updated to a value obtained by subtracting S2/2 from Yc before correction. With the process in step S508 or S509, the second frame setting process is completed.

Returning to the description of FIG. 15, after the second frame setting process, the CPU 31 causes a game image to be displayed on the television 2. That is, in step S6, a view volume is set specifically by using the scheme described with reference to FIGS. 13A and 13B. With this, an area in the game space 71 is determined as a display area. Furthermore, in step S7, a game image is displayed on the television 2. Specifically, based on the determined view volume, a game image representing the game space 71 when viewed from the direction of the line of sight 73 is generated. In the above steps S2 through S7, a game image for one frame is generated. Thereafter, the CPU 31 repeats steps S2 through S7 to perform the game process.

In the above first frame setting process (step S4), the selected objects are always contained in the first frame 77. Here, for example, if a new selected object appears in the game space in step S2 or S3, the first frame 77 may be required to be abruptly expanded or reduced. That is, if a new selected object appears in an area that is different from the area being displayed in one frame, the first frame 77 is significantly expanded in the next frame. As a result, the display area is abruptly changed. Moreover, if the selected object that is present in the game space 71 in one frame disappears in the next frame, the display area may be abruptly changed. Such a game image in which the display area is abruptly changed is thought to be very difficult for the players to view. To get around this problem, a process of preventing such an abrupt change of the display area may be performed, which will be described below in detail.

Figure 19:
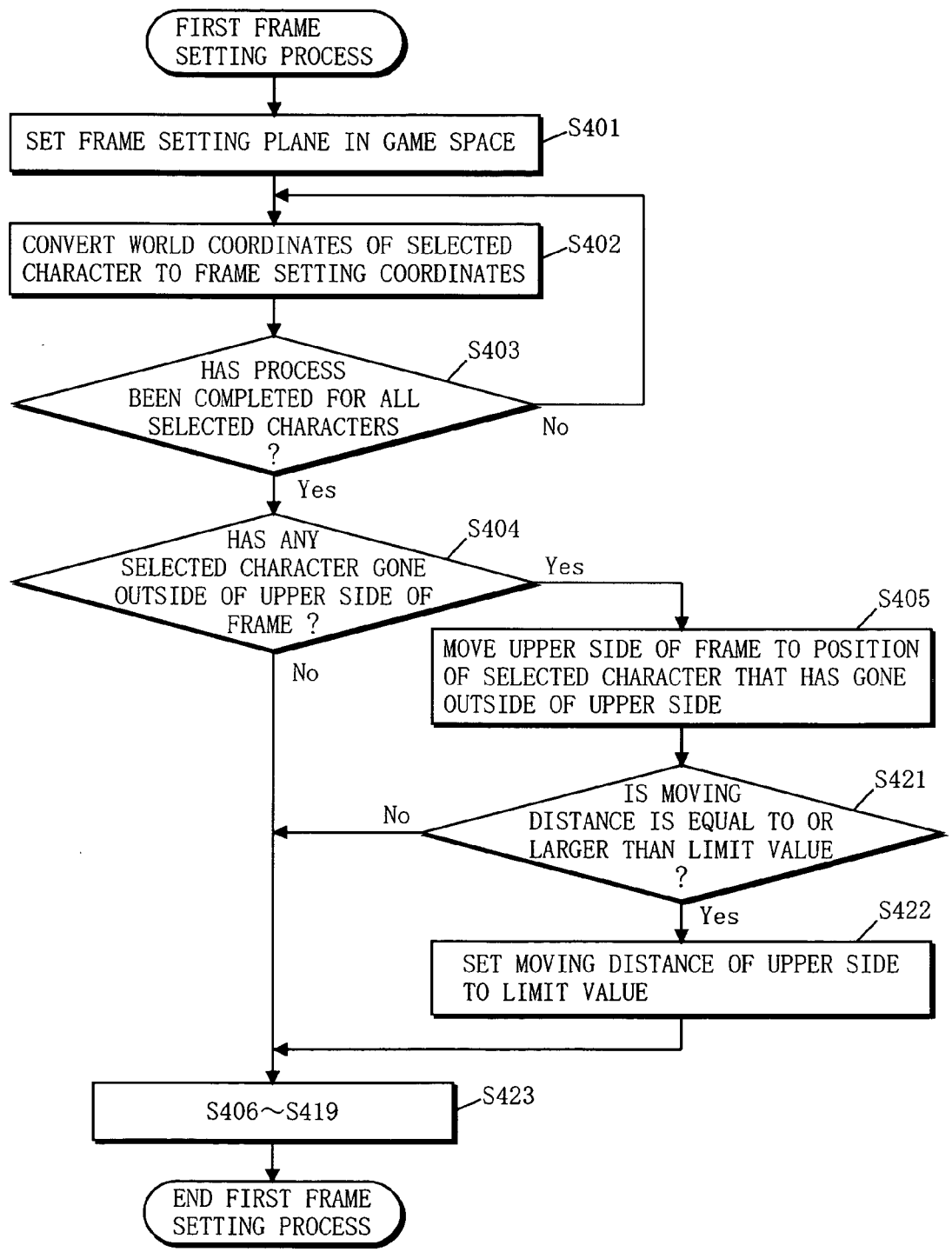
FIG. 19 is a flowchart showing an exemplary modification of a first frame setting process.

FIG. 19 is a flowchart showing an exemplary modification of the first frame setting process. In FIG. 19, processes identical to those shown in FIG. 16 are provided with the same step numbers and are not described herein. The process shown in FIG. 19 is different from that shown in FIG. 16 in that steps S421 and S422 are performed after step S405. In this exemplary modification, after step S405, it is determined in step S421 whether a moving distance of the upper side 77a of the first frame 77 is equal to or larger than a predetermined limit value a. Specifically, Yb of the first frame data 323 before updating and Yb after updating in step S405 are compared with each other, thereby calculating the moving distance of the upper side 77a. Then, the calculated moving distance is compared with the predetermined limit value ã, thereby determining whether the moving distance is equal to or larger than the predetermined limit value ã. If it is determined that the moving distance is equal to or larger than the predetermined limit value, a process in step S422 is performed. On the other hand, if it is determined that the moving distance is smaller than the predetermined limit value, the process in step S422 is skipped, and then a process in step S423 (the processes in steps S406 through S419) is performed.

In step S422, the moving amount of the upper side 77a is restricted to the above predetermined limit value. Specifically, Yb of the first frame data 323 stored in the work memory 32 is updated to a value obtained by adding the predetermined value ã to Yb before updating in step S405. After the process in step S422, the process in step S406 is performed.

As described above, in steps S421 and S422, the first frame 77 is deformed so that the moving distance of the upper side 77a of the first fame 77 per predetermined unit time (frame interval) does not exceed the predetermined limit value. Therefore, the processes in steps S421 and S422 can prevent the upper side 77a of the first frame 77 from being abruptly moved. In FIG. 19, it is determined whether the moving distance is equal to or larger than the predetermined limit value only when the upper side 77a is moved outward. Also when another side is moved outward, processes similar to those in steps S421 and S422 can be performed. With such processes similar to those in step S421 and S422 being performed for all four sides of the first frame 77, the first frame can be prevented from being abruptly moved. As a result, the display area can be prevented from being abruptly expanded.

In the above embodiment, each side of the first frame 77 is moved by the predetermined distance k when being moved inward. In another embodiment, the side to be moved may be moved to the position of the selected object. At this time, as is the case where each side of the first frame 77 is moved outward, each side may be abruptly moved when being moved inward. To avoid this problem, processes similar to those in steps S421 and S422 may be performed also when the four sides of the first frame 77 are moved inward, thereby preventing the first frame from being abruptly reduced. As a result, the display area can be prevented from being abruptly changed. Thus, it is possible to provide a display that is easier for the player to view.

As has been described in the foregoing, according to the present embodiment, the first frame is set so as to include a plurality of selected objects, thereby displaying the selected objects. Furthermore, each of the frames (the first frame and the second frame) is deformed when all of the selected objects are moved inward from one of the sides of the frame by a predetermined distance. That is, the frame is not necessarily deformed when any selected object is moved. Therefore, frequent deformations of the frame can be prevented, thereby preventing the display area from being frequently moved.

Thus, the area for displaying the game space can be displayed so as to be easy to view.

Also, according to the present embodiment, the display area is determined based on the frame virtually set in the three-dimensional game space. With this, the display area can be determined without using a fixation point. Therefore, unlike the case where the display area is determined by using a fixation point, a situation where only a specific object is always displayed on the center of the screen never occurs. Therefore, according to the embodiment, even for a game in which a plurality of objects get attention, each of these objects can be displayed similarly. That is, a plurality of objects can be displayed so as to be easy to view.

In the present embodiment, description has been made to the game in which a three-dimensional game space is formed. However, the present invention can be applied to a game in which a two-dimensional game plane is formed. To apply the present invention to such a game, a frame setting plane is set on a game plane. Therefore, in this case, a process of converting a world coordinate value to a frame coordinate value is not required. That is, by using the coordinate values of the game plane, the frame can be set and deformed. Also, it can be assumed that the line of sight is perpendicular to the game plane.

Also, in the present embodiment, each of the frames (the first frame 77 and the second frame 78) has a shape of a rectangle (including a square). This is not meant to be restrictive. For example, the frame may have a shape of a polygon or an ellipse. When the frame has a shape of a polygon, that polygon frame can be represented by coordinates of its vertices on the frame setting plane. Also, when the frame has a shape of an ellipse, that ellipse frame can be represented by its center and its major axis and minor axis. Furthermore, for example, the first frame 77 may have a shape of an ellipse, while the second frame 78 may have a shape of a rectangle. According to this, the selected objects are displayed so as to be positioned inside of the ellipse included in the display area (rectangle). Therefore, the selected objects are not displayed at any corner of the screen, and therefore are easy to view.

Still further, in the present embodiment, the first frame 77 is first derived based on the frame coordinate value of each selected object (steps S404 through S419), and then the second frame 78 is derived (steps S501 through S506). In another embodiment, the second frame 78 may be directly derived based on the frame coordinate value of each selected objects. Specifically, when the position of the side of the first frame 77 is set in steps S405 and S413, for example, a margin of the predetermined distance â is taken into consideration for determination. With this, in steps S404 through S419, the second frame 78 can be derived. In this case, the processes in steps S502 and S505 are not necessary.

Still further, in the present embodiment, the frame setting plane is perpendicular to the line of sight. However, the frame setting plane is not restricted to such a plane perpendicular to the line of sight. For example, in the game space 71 shown in FIG. 4, a plane where y=0, for example, may be set as a frame setting plane, and vertices of the view volume may be set on straight lines extending from vertices of a frame set on the plane of y=0 in the direction of the line of sight or the direction of the viewing point. Also, the plane of y=0 is merely an example, and an arbitrary plane in a three-dimensional game space can be set as a frame setting plane.

Figure 20:
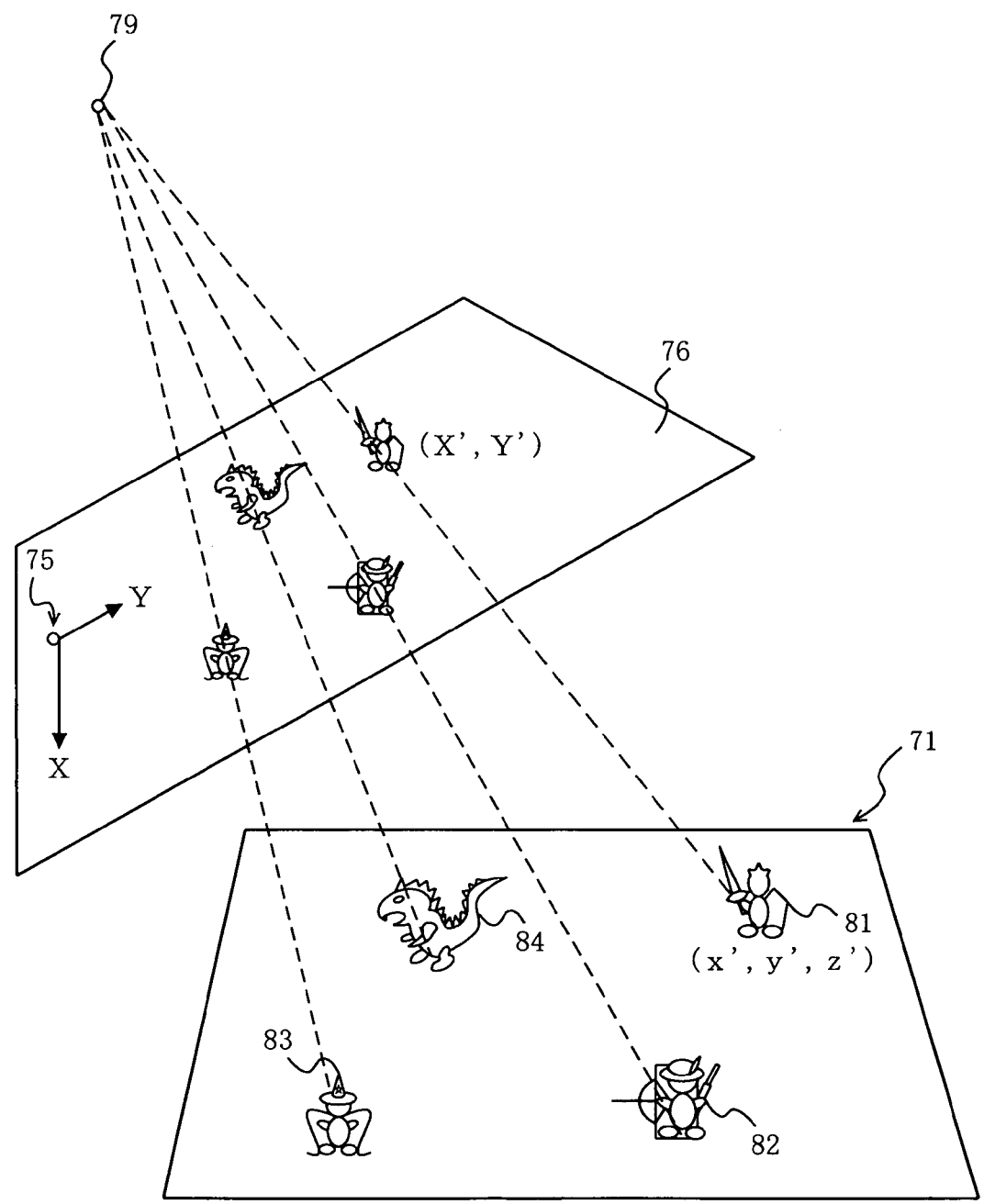
FIG. 20 is an illustration for describing a process of projecting the selected objects onto the frame setting plane based on the position of a viewing point.

Still further, in the present embodiment, the direction of the line of sight is predetermined and, based on the direction of the line of sight, the selected objects are set on the frame setting plane. Here, the present invention can be applied even to a case where the position of the viewing point is predetermined in place of the direction of the line of sight (for example, the position of the viewing point is set in step S1 shown in FIG. 15). FIG. 20 is an illustration for describing a process of projecting the selected objects onto the frame setting plane based on the position of the viewing point. When a viewing point 79 is predetermined, the frame coordinate values of the selected objects are determined based on the position of the viewing point. Specifically, a point of intersection of the frame setting plane 76 and a straight line connecting each selected object in the game space 71 and the viewing point 79 is set as a frame coordinate value of each selected object. Similarly, the position of the origin of the frame coordinate system 75 is set at a point of intersection of the frame setting plane 76 and a straight line connecting the origin of the world coordinate system 72 and the viewing point. As such, by applying the present invention, the frame coordinate value of each selected object can be calculated even when the position of the viewing point is predetermined, as is the case where the direction of the line of sight is predetermined. When the position of the viewing point is predetermined, in order to set a view volume, perspective projection is performed by using the position of the viewing point. Alternatively, the direction of the line of sight is determined based on the position of the viewing point and the second frame (for example, a line drawn from the viewing point to the center of the second frame is first taken as representing the direction of the line of sight). Then, by using the determined direction of the line of sight, a view volume can be set through parallel projection.

While the invention has been described in detail, the foregoing description is in all aspects illustrative and not restrictive. It is understood that numerous other modifications and variations can be devised without departing from the scope of the invention.

What is claimed is:

1. A game system for causing a three-dimensional virtual game space to be displayed on a display device, which has a display area having a shape of a rectangle having a predetermined aspect ratio, in a direction of a predetermined line of sight, the three-dimensional virtual game space having a plurality of objects appearing therein, and at least two of the plurality of objects being set as selected objects, the game system comprising:

movement controller to control the movement of the objects;

line-of-sight direction setting programmed logic circuitry to set the direction of the line of sight;

frame-setting-plane setting programmed logic circuitry to set a frame setting plane in the three-dimensional game space;

frame-coordinate-value calculator to calculate, for each of the selected objects, a frame coordinate value indicative of a point of intersection of the frame setting plane and a straight line passing through the selected object in the three-dimensional game space and extending along the line of sight set by the line-of-sight direction setting programmed logic circuitry;

frame deforming programmed logic circuitry to virtually set a rectangular frame on the frame setting plane, the frame encompassing all the selected objects when the selected objects are projected onto the frame setting plane in the direction of the predetermined line of sight, and deform the frame in accordance with the movements of the selected objects, such that each side of the rectangular frame moves in accordance with the movements of the selected objects and independently from the movement of the other sides of the rectangular frame, while the deformed rectangular frame maintains the encompassing of all the selected objects;

aspect ratio correcting programmed logic circuitry to correct the frame deformed by the frame deforming programmed logic circuitry so as to recreate a frame encompassing the frame deformed by the frame deforming programmed logic circuitry and having an aspect ratio equal to that of the display area of the display device; and display controller to determine vertices of a view volume based on vertices of the frame corrected by the aspect ratio correcting programmed logic circuitry and cause the game space to be displayed on the display device, wherein when every position indicated by the frame coordinate value of each of the selected objects is moved by at least a predetermined distance inward from one side of the frame on the frame setting plane, the frame deforming programmed logic circuitry deforms the frame so that the side is moved towards the inside of the frame.

2. The game system according to claim 1, wherein the display controller determines points on a straight line passing through the vertices of the frame deformed by the frame deforming programmed logic circuitry and extending along the line of sight set by the line-of-sight direction setting programmed logic circuitry as the vertices of the view volume.

3. The game system according to claim 1, wherein the frame-setting-plane setting programmed logic circuitry sets a plane perpendicular to the direction of the line of sight set by the line-of-sight direction setting programmed logic circuitry as the frame setting plane.

4. The game system according to claim 1, wherein when a position indicated by a frame coordinate value of any one of the selected objects is moved outside of one side of the frame on the frame setting plane, the frame deforming programmed logic circuitry deforms the frame so that the side is moved towards the outside of the frame.

5. The game system according to claim 1, further comprising:

frame expanding programmed logic circuitry to expand the frame deformed by the frame deforming programmed logic circuitry by a predetermined width upward, downward, rightward, and leftward on the frame setting plane, wherein the display controller determines the vertices of the view volume based on the vertices of the frame expanded by the frame expanding programmed logic circuitry.

6. The game system according to claim 1, wherein the aspect ratio correcting programmed logic circuitry corrects the frame so that a center of the frame is not changed before and after correction.

7. The game system according to claim 1, further comprising frame correcting programmed logic circuitry to correct the frame so that the frame deformed by the frame deforming programmed logic circuitry has a height longer than a predetermined height and a width longer than a predetermined width, wherein the display controller determines the vertices of the view volume based on vertices of the frame corrected by the frame correcting programmed logic circuitry.

8. The game system according to claim 1, wherein the game system is used by a plurality of players for playing a game, and the selected objects at least include a plurality of player characters operated by the plurality of players.

9. The game system according to claim 1, further comprising selected object changing programmed logic circuitry to add a new selected object or delete at least one of the selected objects, wherein when addition or deletion is performed by the selected object changing programmed logic circuitry, the frame deforming programmed logic circuitry deforms the frame so that a moving distance of one side of the frame per predetermined unit time is shorter than a predetermined distance.

10. A game system for causing a three-dimensional virtual game space to be displayed on a display device, which has a display area having a shape of a rectangle having a predetermined aspect ratio, in a direction of a predetermined line of sight, the three-dimensional virtual game space having a plurality of objects appearing therein, and at least two of the plurality of objects being set as selected objects, the game system comprising:

movement controller to control the movements of the objects;

viewing point position setting programmed logic circuitry to set a position of a viewing point;

frame-setting-plane setting programmed logic circuitry to set a frame setting plane in the three-dimensional game space;

frame-coordinate-value calculator to calculate, for each of the selected objects, a frame coordinate value indicative of a point of intersection of the frame setting plane and a straight line connecting the selected object in the three-dimensional game space and the position of the viewing point set by the viewing point position setting programmed logic circuitry;

frame deforming programmed logic circuitry to virtually set a rectangular frame on the frame setting plane, the frame encompassing all the selected objects when the selected objects are projected onto the frame setting plane in the direction of the predetermined line of sight, and deform the frame in accordance with the movements of the selected objects, such that each side of the rectangular frame moves in accordance with the movements of the selected objects and independently from the movement of the other sides of the rectangular frame, while the deformed rectangular frame maintains the encompassing of all the selected objects;

aspect ratio correcting programmed logic circuitry to correct the frame deformed by the frame deforming programmed logic circuitry so as to recreate a frame encompassing the frame deformed by the frame deforming programmed logic circuitry and having an aspect ratio equal to that of the display area of the display device; and display controller to determine vertices of a view volume based on vertices of the frame corrected by the aspect ratio correcting programmed logic circuitry and cause the game space to be displayed on the display device, wherein when every position indicated by the frame coordinate value of each of the selected objects is moved by at least a predetermined distance inward from one side of the frame on the frame setting plane, the frame deforming programmed logic circuitry deforms the frame so that the side is moved towards the inside of the frame.

11. The game system according to claim 10, wherein the display controller determines points on a straight line connecting the vertices of the frame deformed by the frame deforming programmed logic circuitry and the viewing point as the vertices of the view volume.

12. The game system according to claim 10, wherein when a position indicated by a frame coordinate value of any one of the selected objects is moved outside of one side of the frame on the frame setting plane, the frame deforming programmed logic circuitry deforms the frame so that the side is moved towards the outside of the frame.

13. The game system according to claim 10, further comprising:
frame expanding programmed logic circuitry to expand the frame deformed by the frame deforming programmed logic circuitry by a predetermined width upward, downward, rightward, and leftward on the frame setting plane, wherein
the display controller determines the vertices of the view volume based on the vertices of the frame expanded by the frame expanding programmed logic circuitry.

14. The game system according to claim 10, wherein the aspect ratio correcting programmed logic circuitry corrects the frame so that a center of the frame is not changed before and after correction.

15. The game system according to claim 10, further comprising
frame correcting programmed logic circuitry to correct the frame so that the frame deformed by the frame deforming programmed logic circuitry has a height longer than a predetermined height and a width longer than a predetermined width, wherein
the display controller determines the vertices of the view volume based on vertices of the frame corrected by the frame correcting programmed logic circuitry.

16. The game system according to claim 10, wherein the game system is used by a plurality of players for playing a game, and
the selected objects at least include a plurality of player characters operated by the plurality of players.

17. The game system according to claim 10, further comprising
selected object changing programmed logic circuitry to add a new selected object or delete at least one of the selected objects, wherein
when addition or deletion is performed by the selected object changing programmed logic circuitry, the frame deforming programmed logic circuitry deforms the frame so that a moving distance of one side of the frame per predetermined unit time is shorter than a predetermined distance.

18. A game system for causing a two-dimensional virtual game plane to be displayed on a display device, which has a display area having a shape of a rectangle having a predetermined aspect ratio, in a direction of a predetermined line of sight, the two-dimensional virtual game space having a plurality of objects appearing therein, and at least two of the plurality of objects being set as selected objects, the game system comprising:
movement controller to control the movements of the objects;
frame deforming programmed logic circuitry to deform a frame according to the movements of the selected objects, the frame having a shape of a rectangle and being virtually set on the two-dimensional game plane so that the selected objects are positioned inside of the frame, wherein the frame encompasses all the selected objects when the selected objects are projected onto a frame setting plane in the direction of the predetermined line of sight such that each side of the rectangular frame moves in accordance with the movements of the selected objects and independently from the movement of the other sides of the rectangular frame, while the deformed rectangular frame maintains the encompassing of all the selected objects;
aspect ratio correcting programmed logic circuitry to correct the frame deformed by the frame deforming programmed logic circuitry so as to recreate a frame encompassing the frame deformed by the frame deforming programmed logic circuitry and having an aspect ratio equal to that of the display area of the display device; and
display controller to determine a display area to be displayed on the display device so that an area defined by the frame corrected by the aspect ratio correcting programmed logic circuitry on the game plane is displayed, wherein
when all of the selected objects are moved by at least a predetermined distance inward from one side of the frame, the frame deforming programmed logic circuitry deforms the frame by moving the side towards the inside of the frame.

19. A computer-readable storage medium having stored therein a game program executed by a computer of a game system for causing a three-dimensional virtual game space to be displayed on a display device, which has a display area having a shape of a rectangle having a predetermined aspect ratio, in a direction of a predetermined line of sight, the three-dimensional virtual game space having a plurality of objects appearing therein, and at least two of the plurality of objects being set as selected objects, the game program comprising:
controlling the movements of the objects;
setting the direction of the line of sight;
setting a frame setting plane in the three-dimensional game space;
calculating, for each of the selected objects, a frame coordinate value indicative of a point of intersection of the frame setting plane and a straight line passing through the selected object in the three-dimensional game space and extending along the line of sight set in the line-of-sight direction setting;
virtually setting a rectangular frame on the frame setting plane, the frame encompassing all the selected objects when the selected objects are projected onto the frame setting plane in the direction of the predetermined line of sight, and deforming the frame in accordance with the movements of the selected objects, such that each side of the rectangular frame moves in accordance with the movements of the selected objects and independently from the movement of the other sides of the rectangular frame, while the deformed rectangular frame maintains the encompassing of all the selected objects;
correcting the aspect ratio of the frame to correct the frame deformed by the deforming so as to recreate a frame encompassing the frame deformed by the deforming and having an aspect ratio equal to that of the display area of the display device; and
determining vertices of a view volume based on vertices of the frame corrected by the correcting the aspect ratio, and causing the game space to be displayed on the display device, wherein
in the frame deforming, when every position indicated by the frame coordinate value of each of the selected objects is moved by at least a predetermined distance inward from one side of the frame on the frame setting plane, the frame is deformed so that the side is moved towards the inside of the frame.

20. A computer-readable storage medium having stored therein a game program executed by a computer of a game system for causing a three-dimensional virtual game space to be displayed on a display device, which has a display area having a shape of a rectangle having a predetermined aspect ratio, in a direction of a predetermined line of sight, the three-dimensional virtual game space having a plurality of objects appearing therein, and at least two of the plurality of objects being set as selected objects, the game program comprising:

controlling the movements of the objects;

setting a viewing point;

setting a frame setting plane in the three-dimensional game space;

calculating, for each of the selected objects, a frame coordinate value indicative of a point of intersection of the frame setting plane and a straight line connecting the selected object in the three-dimensional game space and the viewing point set in the viewing point setting;

virtually setting a rectangular frame on the frame setting plane, the frame encompassing all the selected objects when the selected objects are projected onto the frame setting plane in the direction of the predetermined line of sight, and deforming the frame in accordance with the movements of the selected objects, such that each side of the rectangular frame moves in accordance with the movements of the selected objects and independently from the movement of the other sides of the rectangular frame, while the deformed rectangular frame maintains the encompassing of all the selected objects;

correcting the aspect ratio of the frame to correct the frame deformed by the deforming so as to recreate a frame encompassing the frame deformed by the deforming and having an aspect ratio equal to that of the display area of the display device; and determining vertices of a view volume based on vertices of the frame corrected by the correcting the aspect ratio, and causing the game space to be displayed on the display device, wherein in the frame deforming, when every position indicated by the frame coordinate value of each of the selected objects is moved by at least a predetermined distance inward from one side of the frame on the frame setting plane, the frame is deformed so that the side is moved towards the inside of the frame.

21. A computer-readable storage medium having stored therein a game program executed by a computer of a game system for causing a two-dimensional virtual game plane to be displayed on a display device, which has a display area having a shape of a rectangle having a predetermined aspect ratio, in a direction of a predetermined line of sight, the two-dimensional virtual game space having a plurality of objects appearing therein, and at least two of the plurality of objects being set as selected objects, the game program comprising:

controlling the movements of the objects;

deforming a frame according to the movements of the selected objects, the frame having a shape of a rectangle and being virtually set on the two-dimensional game plane so that the selected objects are positioned inside of the frame, wherein the frame encompasses all the selected objects when the selected objects are projected onto a frame setting plane in the direction of the predetermined line of sight, such that each side of the rectangular frame moves in accordance with the movements of the selected objects and independently from the movement of the other sides of the rectangular frame, while the deformed rectangular frame maintains the encompassing of all the selected objects;

correcting the aspect ratio of the frame to correct the frame deformed by the deforming so as to recreate a frame encompassing the frame deformed by the deforming and having an aspect ratio equal to that of the display area of the display device; and determining a display area to be displayed on the display device so that an area included in the frame corrected by the correcting the aspect ratio on the game plane is displayed, wherein in the frame deforming, when all of the selected objects are moved by at least a predetermined distance inward from one side of the frame, the frame is deformed by moving the side towards the inside of the frame.

* * * * *